United States Patent
Matsuda et al.

(10) Patent No.: US 6,844,496 B2
(45) Date of Patent: Jan. 18, 2005

(54) WIRE HARNESS MOUNTING METHOD, WIRE HARNESS MOUNTING PORTION STRUCTURE, WIRE HARNESS MOUNTING TYPE VEHICLE COMPONENT, WIRE HARNESS MOUNTING TYPE VEHICLE COMPONENT MODULE, AND METHOD OF ASSEMBLING AND INSPECTING WIRE HARNESS

(75) Inventors: Yutaka Matsuda, Tokyo (JP); Minoru Asano, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 175 days.

(21) Appl. No.: 10/005,384

(22) Filed: Nov. 2, 2001

(65) Prior Publication Data

US 2002/0098717 A1 Jul. 25, 2002

(30) Foreign Application Priority Data

| Nov. 2, 2000 | (JP) | ................................... | 2000-336486 |
| Apr. 9, 2001 | (JP) | ................................... | 2001-110345 |
| May 2, 2001 | (JP) | ................................... | 2001-134885 |
| Jun. 6, 2001 | (JP) | ................................... | 2001-171729 |
| Jun. 13, 2001 | (JP) | ................................... | 2001-178215 |
| Aug. 6, 2001 | (JP) | ................................... | 2001-237899 |
| Aug. 22, 2001 | (JP) | ................................... | 2001-250926 |

(51) Int. Cl.$^7$ ........................................... H01R 33/00
(52) U.S. Cl. .................. 174/72 A; 29/868; 29/825; 29/854; 29/857; 439/34
(58) Field of Search ................... 29/868, 825, 854, 29/857; 439/34; 174/72 A

(56) References Cited

U.S. PATENT DOCUMENTS 6,168,122 B1 * 1/2001 Lobsiger et al. ........... 248/68.1

* cited by examiner

Primary Examiner—Dean A. Reichard
Assistant Examiner—Jinhee Lee
(74) Attorney, Agent, or Firm—Knobbe Martens Olson & Bear LLP

(57) ABSTRACT

Disclosed is a wire harness mounting method for mounting a wire harness to a wire harness holding portion provided on a vehicle-mounted component, such as an air conditioning duct, wherein the wire harness consists of two or more sub wire harnesses produced separately, the sub wire harnesses being arranged on the wire harness holding portion and collectively held by the wire harness holding portion to thereby complete the mounting of the wire harness.

3 Claims, 41 Drawing Sheets

WIRE HARNESS MOUNTING METHOD, WIRE HARNESS MOUNTING PORTION STRUCTURE, WIRE HARNESS MOUNTING TYPE VEHICLE COMPONENT, WIRE HARNESS MOUNTING TYPE VEHICLE COMPONENT MODULE, AND METHOD OF ASSEMBLING AND INSPECTING WIRE HARNESS

BACKGROUND OF THE INVENTION

The present invention relates to a wire harness mounting method, a wire harness mounting portion structure, a wire harness mounting type vehicle component, a wire harness mounting type vehicle component module, and a method of assembling and inspecting a wire harness.

Nowadays, to achieve an improvement in production efficiency, in quality, etc. for wire harnesses, a sub division production system is adopted, in which a wire harness to be produced is divided into a number of sub wire harnesses. In this system, production is performed for each of the sub wire harnesses, obtained through division, in a sub wire harness production process. The sub wire harnesses produced are assembled in a harness assembly process to finally complete a wire harness.

Recently, an automatic sub wire harness producing machine is often used in the sub wire harness production process. In this automatic sub wire harness producing machine, the manufacturing steps for each circuit of each sub wire harness, including wire cutting, insulation coating removal at wire terminals, terminal crimping, and connector insertion, are automatically performed to automatically manufacture each sub wire harness.

In this automatic sub wire harness producing machine, there are usually limitations regarding the kind of connector, terminal, and wire to be used therewith, depending upon the scale of the equipment. Thus, the number of circuits of a single sub wire harness that can be produced by the automatic producing machine is restricted.

Further, when the sub wire harness is large, the operational efficiency of the harness assembly process, in which sub wire harnesses are assembled to complete one wire harness, deteriorates. In view of this, it is regarded, at present, as desirable for the number of circuits in each sub wire harness to be approximately twenty to thirty at the maximum.

Usually, in the harness assembly process for assembling each sub wire harness, a harness assembly wiring table is used. On this harness assembly wiring table, wiring jigs for performing wiring on a sub wire harness, such as a connector temporary fixing jig and a branching portion temporary fixing jig, and exterior component mounting jigs for mounting, after wiring and assembly of each sub wire harness, exterior components, such as a wire tying tape, a wire harness fastening clip, and a wire protecting tube, are arranged in accordance with the size and configuration of the wire harness to be completed. After performing wiring on each sub wire harness in conformity with the above-mentioned wiring jigs and assembling the sub wire harness, the exterior components are mounted in conformity with the exterior component mounting jigs, whereby a single wire harness is finally completed.

When circuits of different sub wire harnesses are to be connected by using a press contact connector, the press contact connector is retained on the harness assembly wiring table, and when or after the sub wire harnesses are combined together, the wires of the circuits in the sub wire harnesses to be connected are respectively set on the press contact connector, and press contact connection is effected by a press contact fitting machine provided on the harness assembly wiring table side.

When circuits of different sub wire harnesses are to be connected by welding, the sub wire harnesses are combined together, and then the crimp terminals of the circuits of the sub wire harnesses to be connected and wire conductor terminal portions not inserted into a connector are put together, and the conductor terminals are collectively connected by welding by means of a welder provided on the harness assembly wiring table side.

The wire harness thus completed is usually mounted to a vehicle or to a vehicle-mounted component in an automotive assembly line.

Recently, however, a so-called module production system is under consideration, according to which instrument panel components are previously assembled in an instrument panel assembly line, which is separate from the vehicle assembly line, and instrument panel modules completed are collectively mounted to a vehicle in the vehicle assembly line. The instrument panel components include control units such as an air conditioning unit and an audio unit, an indicating device such as a meter, an operating panel such as a center cluster panel, various switches and sensors, structures such as a reinforcing bar and an instrument panel main body, and a wire harness.

As is also being considered, when the above-mentioned module production system is adopted, the wire harness production process is executed, for example, beside the instrument panel assembly sub line, and the wire harness produced is supplied directly to the instrument panel assembly sub line and mounted to an instrument panel module, thereby reducing wire harness distribution, inventories, etc. and achieving an improvement in the efficiency in vehicle production.

As a result of the diversification in customer needs, as many as several hundreds kinds of wire harnesses are required depending on the presence/absence of various types of equipment and combinations of variations.

To reduce the number of kinds of wire harnesses, a single wire harness product number is assigned to a plurality of relatively similar vehicle specifications. Despite this measure, however, the wire harness product number can be as large as approximately one hundred.

SUMMARY OF THE INVENTION

The present invention provides a wire harness mounting method for mounting a wire harness to a wire harness holding portion provided on a vehicle-mounted component or a vehicle main body, wherein the wire harness consists of two or more sub wire harnesses produced separately, the sub wire harnesses being arranged on the wire harness holding portion and collectively held by the wire harness holding portion to thereby complete the mounting of the wire harness.

The present invention provides a wire harness mounting method according to Claim 1, wherein the two or more sub harnesses include a common base sub harness consisting of a collection of circuits common to a plurality of vehicle types or a plurality of specifications of a single vehicle type and option sub harnesses each consisting of a collection of at least one circuit for a specific vehicle type or certain specifications, the sub harnesses being appropriately combined in accordance with the vehicle type or specifications and arranged on the wire harness holding portion.

The present invention provides a wire harness mounting method according to Claim 1, wherein the arrangement of the two or more sub wire harnesses on the wire harness holding portion is conducted in parallel with the assembly of the vehicle in accordance with information on vehicle specifications of the vehicle assembly line.

The present invention provides a wire harness mounting method for mounting a wire harness to a wire harness holding portion provided on a vehicle-mounted component, wherein the wire harness consists of two or more sub wire harnesses produced separately, and wherein the vehicle-mounted component is arranged on a wiring table for assembling the sub wire harnesses into a wire harness, the two or more sub harnesses being arranged on the wire harness holding portion of the vehicle-mounted component and on the wiring table, the two or more sub harnesses arranged being collectively held by the wire harness holding portion to thereby complete the mounting of the wire harness to the vehicle-mounted component.

The present invention provides a harness mounting portion structure for a wire harness mounting method for mounting a wire harness to a wire harness holding portion provided on a vehicle-mounted component or a vehicle main body, wherein the wire harness consists of two or more sub wire harnesses produced separately, the sub wire harnesses being arranged on the wire harness holding portion and collectively held by the wire harness holding portion to thereby complete the mounting of the wire harness, wherein the wire harness holding portion has a cutout for effecting the positioning of a branch line portion of a sub wire harness, and wherein a guide portion extending in the branch line portion lead-out direction is provided at the edge of the cutout.

The present invention provides a harness mounting portion structure for a wire harness mounting method for mounting a wire harness to a wire harness holding portion provided on a vehicle-mounted component or a vehicle main body, wherein the wire harness consists of two or more sub wire harnesses produced separately, the sub wire harnesses being arranged on the wire harness holding portion and collectively held by the wire harness holding portion to thereby complete the mounting of the wire harness, wherein the wire harness holding portion has two or more cutouts for effecting the positioning of branch line portions of the sub wire harnesses, wherein different colors are given to the edges of the cutouts, and wherein tapes of different colors respectively corresponding to those of the cutout edges are attached to the branch line portions of the sub wire harnesses.

The present invention provides a harness mounting portion structure for a wire harness mounting method for mounting a wire harness to a wire harness holding portion provided on a vehicle-mounted component or a vehicle main body, wherein the wire harness consists of two or more sub wire harnesses produced separately, the sub wire harnesses being arranged on the wire harness holding portion and collectively held by the wire harness holding portion to thereby complete the mounting of the wire harness, wherein the wire harness holding portion has two or more cutouts for effecting the positioning of branch line portions of the sub wire harnesses, wherein different colors are given to the edges of the cutouts, and wherein different colors respectively corresponding to those of the cutout edges are given to connectors mounted to the forward ends of the branch line portions of the sub wire harnesses.

The present invention provides a harness mounting portion structure for a wire harness mounting method for mounting a wire harness to a wire harness holding portion provided on a vehicle-mounted component or a vehicle main body, wherein the wire harness consists of two or more sub wire harnesses produced separately, the sub wire harnesses being arranged on the wire harness holding portion and collectively held by the wire harness holding portion to thereby complete the mounting of the wire harness, wherein connector temporary fixing jigs for temporarily fixing connectors mounted to the forward ends of branch line portions of the sub wire harnesses and/or branching-off portion temporary fixing jigs for temporarily fixing branching-off portions of the branch line portions of the sub wire harnesses are provided on the vehicle-mounted component or an assembly table thereof or on the vehicle main body or an assembly table thereof.

The present invention provides a harness mounting portion structure for a wire harness mounting method for mounting a wire harness to a wire harness holding portion provided on a vehicle-mounted component or a vehicle main body, wherein the wire harness consists of two or more sub wire harnesses produced separately, the sub wire harnesses being arranged on the wire harness holding portion and collectively held by the wire harness holding portion to thereby complete the mounting of the wire harness, wherein exterior component temporary fixing jigs for temporarily fixing exterior components of the wire harness are provided on the vehicle-mounted component or an assembly table thereof or on the vehicle main body or an assembly table thereof.

The present invention provides a harness mounting portion structure for a wire harness mounting method for mounting a wire harness to a wire harness holding portion provided on a vehicle-mounted component or a vehicle main body, wherein the wire harness consists of two or more sub wire harnesses produced separately, the sub wire harnesses being arranged on the wire harness holding portion and collectively held by the wire harness holding portion to thereby complete the mounting of the wire harness, wherein an exterior component mounting instruction table providing instructions on the mounting of exterior components on the wire harness is provided on the vehicle-mounted component or an assembly table thereof or on the vehicle main body or an assembly table thereof.

The present invention provides a harness mounting portion structure for a wire harness mounting method for mounting a wire harness to a wire harness holding portion provided on a vehicle-mounted component or a vehicle main body, wherein the wire harness consists of two or more sub wire harnesses produced separately, the sub wire harnesses being arranged on the wire harness holding portion and collectively held by the wire harness holding portion to thereby complete the mounting of the wire harness, wherein a press contact connector for connecting wires of the wire harness is held on the wire harness holding portion, on the vehicle-mounted component or an assembly table thereof, or on the vehicle main body or an assembly table thereof.

The present invention provides a harness mounting portion structure for a wire harness mounting method for mounting a wire harness to a wire harness holding portion provided on a vehicle-mounted component or a vehicle main body, wherein the wire harness consists of two or more sub wire harnesses produced separately, the sub wire harnesses being arranged on the wire harness holding portion and collectively held by the wire harness holding portion to thereby complete the mounting of the wire harness, wherein a welding machine for connecting wires of the wire harness by welding is provided on a vehicle-mounted component assembly table or in the vicinity thereof, or on a vehicle main body assembly table or in the vicinity thereof.

The present invention provides a wire harness mounting vehicle component module, wherein a wire harness holding portion to which a wire harness trunk portion is to be mounted is provided on at least one of the vehicle components constituting the module, and wherein temporary locking means which temporarily lock, of connectors mounted to the forward ends of branch lines of the wire harness, those connectors having no associated connection elements at the stage where the module is assembled, are provided on the outer surface of other vehicle components constituting the module or the vehicle component to which the wire harness holding portion is mounted, the positions of the temporary locking means being determined such that, when such connectors are temporarily connected, a prescribed branch line length is ensured.

The present invention provides a wire harness mounting method for mounting a wire harness to a wire harness holding portion provided on a vehicle-mounted component, wherein the wire harness is produced by separately preparing a common base sub harness consisting of a collection of circuits for use common to a plurality of vehicle types or a plurality of specifications of a single vehicle type and at least two option sub harnesses each consisting of a collection of circuits for a specific vehicle type or certain specifications, and wherein, when appropriately combining these sub harnesses in accordance with the vehicle type or specifications and mounting them to the wire harness holding portion, the option sub harnesses are first mounted and the common base sub harness is finally mounted.

The present invention provides a wire harness mounting type vehicle component, wherein a trunk line holding portion for holding a trunk line of a wire harness is formed integrally with a vehicle component, wherein a branching-off guide is integrally formed at a position where a branch line branches off from the wire harness trunk line held by the trunk line holding portion, and wherein a branch line protecting member on which the wire harness branch line extends is integrally formed at the forward end of the branching-off guide.

The present invention provides a wire harness assembly method for assembling a wire harness by selectively combining a plurality of sub harnesses in accordance with vehicle specifications, wherein every sub harness is provided with a specific connector to be fitted into an electrical connection box prepared for the purpose, and wherein, when assembling a wire harness by combining the plurality of sub harnesses, the specific connector of each sub harness is fitted into a predetermined portion of the electrical connection box.

The present invention provides a wire harness inspecting method, wherein after a wire harness has been assembled by a wire harness assembly method for assembling a wire harness by selectively combining a plurality of sub harnesses in accordance with vehicle specifications, wherein every sub harness is provided with a specific connector to be fitted into an electrical connection box prepared for the purpose, and wherein, when assembling a wire harness by combining the plurality of sub harnesses, the specific connector of each sub harness is fitted into a predetermined portion of the electrical connection box, it is checked whether the combination of sub harnesses is in conformity with the vehicle specifications or not according to the presence/absence of a specific connector fitted into the electrical connection box.

The present invention provides a wire harness mounting type vehicle component, wherein a wire harness holding portion for holding a trunk line portion of a wire harness is formed on a vehicle component, wherein a branching-off guide is integrally formed at a position where a branch line branches off from the wire harness trunk line held by the wire harness holding portion, and wherein a branch line protecting member on which the wire harness branch line extends is integrally formed at the forward end of the branching-off guide.

The present invention provides a wire harness mounting type vehicle component, wherein a wire harness holding portion for protecting a trunk line portion of a wire harness is formed on a vehicle component, and wherein a movement restraining means for restraining the wire harness in its movement is provided on the wire harness holding portion.

The present invention provides a wire harness mounting type vehicle component, wherein a wire harness holding portion for holding a trunk line of a wire harness is formed on a vehicle component, wherein a branching-off guide is integrally formed at a position where a branch line branches off from the wire harness trunk line held by the trunk line holding portion, wherein a branch line protecting member on which the wire harness branch line extends is integrally formed at the forward end of the branching-off guide, and wherein a movement restraining means for restraining the wire harness in its movement is provided on the wire harness holding portion.

BRIEF DESCRIPTION OF THE DRAWINGS

In the accompanying drawings:

FIGS. 49(A) and 49(B) are diagrams showing a state in which a wire harness is accommodated in the wire harness holding portion of the vehicle component of FIG. 48, of which FIG. 49(A) is a sectional view showing a case in which the number of option sub wire harnesses is small, and FIG. 49(B) is a sectional view showing a case in which the number of option sub wire harnesses is large;

FIGS. 51(A) and 51(B) are diagrams showing a state in which a wire harness is accommodated in the wire harness holding portion of the vehicle component of FIG. 50, of which FIG. 51(A) is a sectional view showing a case in which the number of option sub wire harnesses is small, and FIG. 51(B) is a sectional view showing a case in which the number of option sub wire harnesses is large;

DETAILED DESCRIPTION

Figure 1:
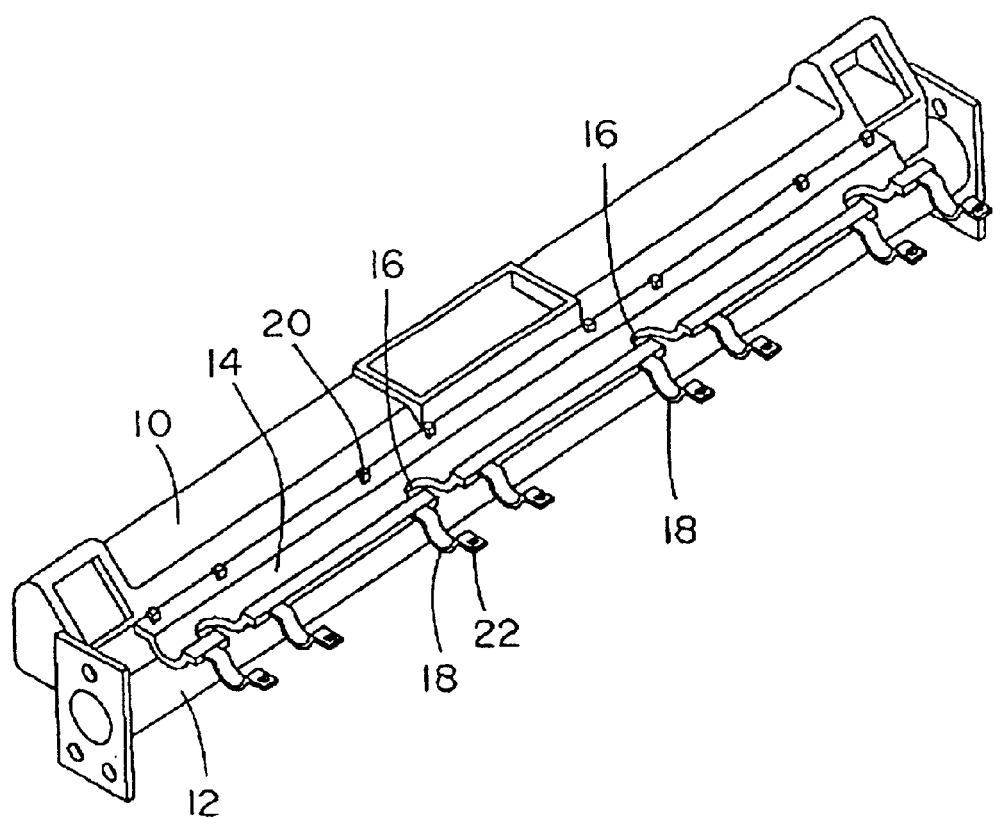
FIG. 1 is a perspective view of an air conditioning duct provided with a wire harness holding portion used in an embodiment of the present invention.

Embodiments of the present invention will now be described with reference to the drawings while comparing them with the prior art.

(First Embodiment)

As stated above, apart from the sub wire harness production process in which a plurality of automatic sub wire harness producing machines are installed according to the number of sub wire harnesses, the conventional wire harness production process requires a harness assembly process in which a harness assembly wiring table, a press contact connector fitting machine, a wire terminal conductor welding machine, etc. are installed, so that a large space is required. Further, when line production is conducted by installing a plurality of harness assembly wiring tables in order to shorten the tact time in the harness assembly process, a still larger space is required, and it is very difficult to ensure such a large space beside, for example, the instrument panel assembly line.

Further, the wire harness requires assembly and mounting processes in which after wiring on the harness assembly wiring table for assembly, the sub wire harness produced by an automatic sub wire harness producing machine is detached from the harness assembly wiring table and mounted again to the instrument panel or the like. At present, these assembly and mounting operations are manually conducted in most cases, so that the processing cost ratio is very high, which leads to an increase in cost.

Further, the wire harness production process requires a harness assembly wiring table, a stand for securing it in position, etc. When line production is conducted by installing a plurality of harness assembly wiring tables, it is necessary to provide equipment, such as a conveyor for moving the harness assembly wiring tables, which also leads to an increase in cost.

Apart from this, the wire harness product number is enormous, resulting in high management cost. Further, the specifications of the wire harness to be mounted are only known immediately before the mounting, so that it is necessary to provide a considerable amount of inventories for each of wire harnesses of different specifications, making it necessary to provide a warehouse. Further, it takes time and effort to control loading and unloading, which also leads to an increase in cost.

In the conventional technique for reducing the wire harness product number, one product number is assigned to the specifications of a plurality of relatively similar vehicles, that is, the wire harness of maximum specifications is assigned, so that unnecessary circuits are imparted to vehicles which are of not maximum specifications, resulting in an increase in cost and weight.

In accordance with a first embodiment of the present invention, there are provided a wire harness mounting method that solves the problems mentioned above, and a wire harness mounting portion structure suitable for executing the method.

In the first embodiment, a wire harness is mounted to an air conditioning duct inside an instrument panel.

FIG. 1 shows an air conditioning duct 10 incorporated into an instrument panel, and a reinforcing bar 12 combined therewith. The air conditioning duct 10 is provided with a wire harness holding portion 14 extending along the longitudinal direction thereof. While in this example the wire harness holding portion 14 has a trough-like configuration, it is also possible to adopt some other configuration as long as it allows a wire harness to be easily mounted. The wire harness holding portion 14 may be prepared as a separate component to be attached to the air conditioning duct 10, or it may be formed integrally with the air conditioning duct 10.

The wire harness holding portion 14 is provided with a plurality of cutouts 16 for performing positioning of the branch portions of the wire harness and a plurality of fastening members 18 for fastening the wire harness. Each of the fastening members 18 is of a band type. One end of each fastening member 18 is hinged on one side edge of the wire harness holding portion 14, and the other end thereof has a hole 22 to be engaged with an engagement protrusion 20 formed on the other side edge of the wire harness holding portion 14. The fastening members 18 may be formed integrally with the wire harness holding portion 14, or prepared as separated parts.

Figure 2:
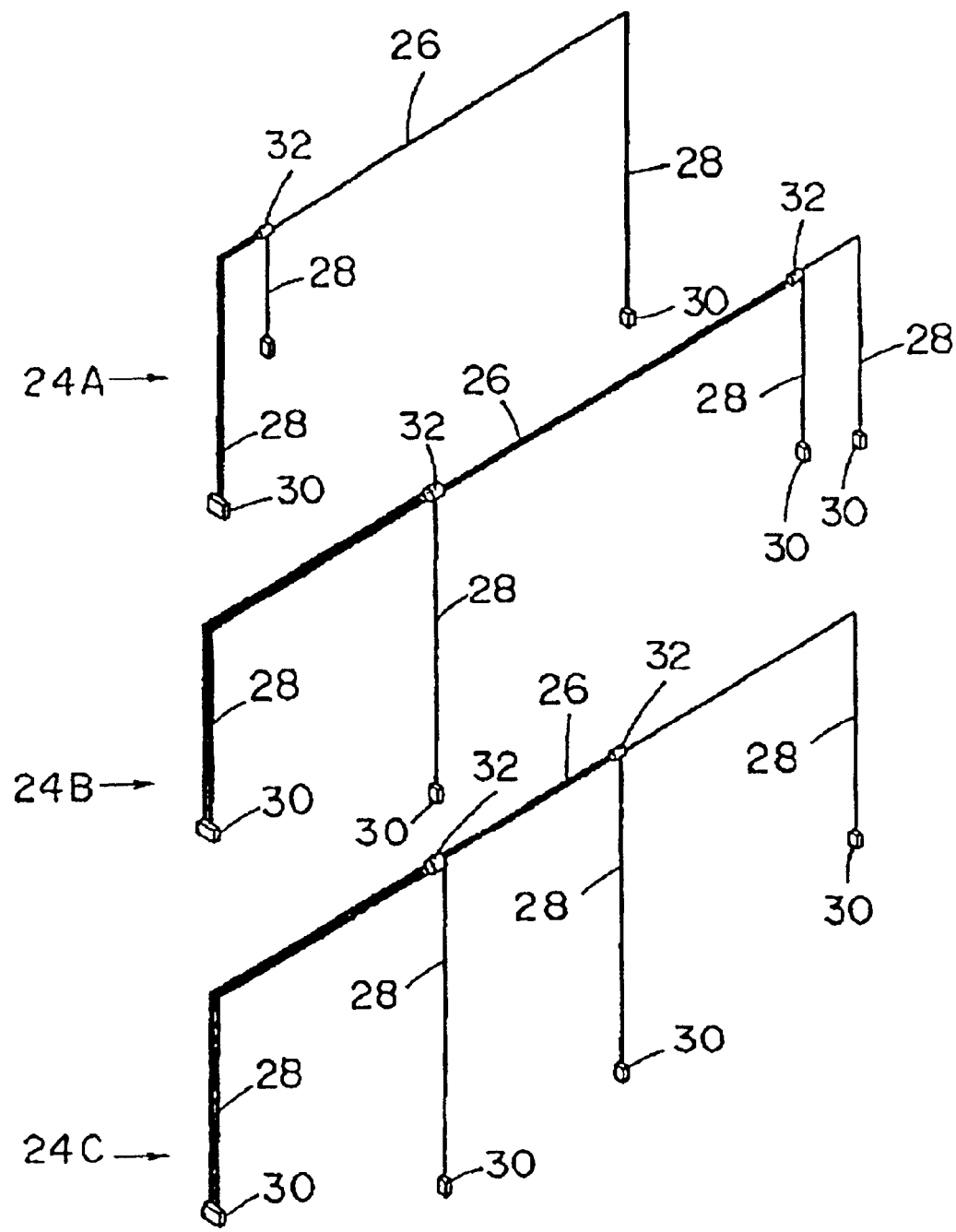
FIG. 2 is a perspective view of a plurality of sub wire harnesses used in an embodiment of the present invention.

As shown in FIG. 2, the wire harness to be mounted to the wire harness holding portion 14 is composed of a plurality of sub wire harnesses 24A, 24B, and 24C prepared as separate components. In each of the sub wire harnesses 24A, 24B, and 24C, numeral 26 indicates a trunk portion, numeral 28 indicates branch portions, numeral 30 indicates connectors mounted to the forward ends of the branch portions 28, and numeral 32 indicates uniting members for uniting the branching-off portions of the branch portions 28 with the trunk portions. These sub wire harnesses 24A through 24C can be automatically produced by an automatic sub wire harness producing machine. At the stage where the sub wire harnesses are produced, up to the following operations are conducted: wire cutting, removal of insulating coating at wire terminals, terminal crimping, and connector insertion.

Figure 3:
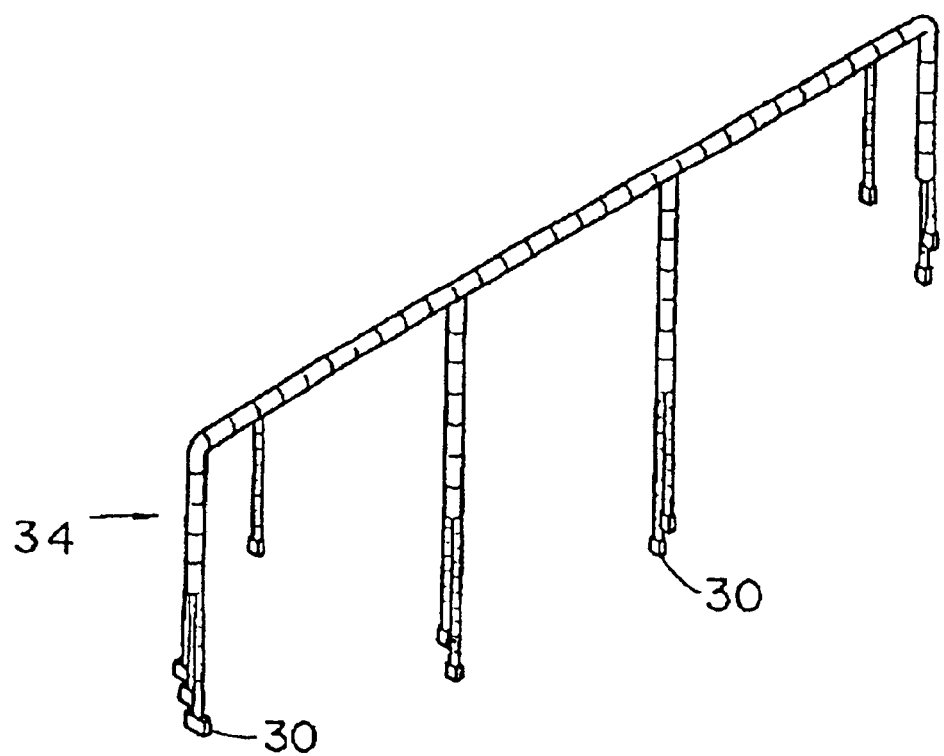
FIG. 3 is a perspective view of a wire harness assembled using the sub wire harnesses shown in FIG. 2.

Conventionally, these sub wire harnesses 24A through 24C are combined and tied together by a tape to complete a wire harness 34 as shown in FIG. 3, and this wire harness 34 is mounted to a vehicle-mounted component or a vehicle, whereas, in the present invention, the sub harnesses are mounted individually.

Figure 4:
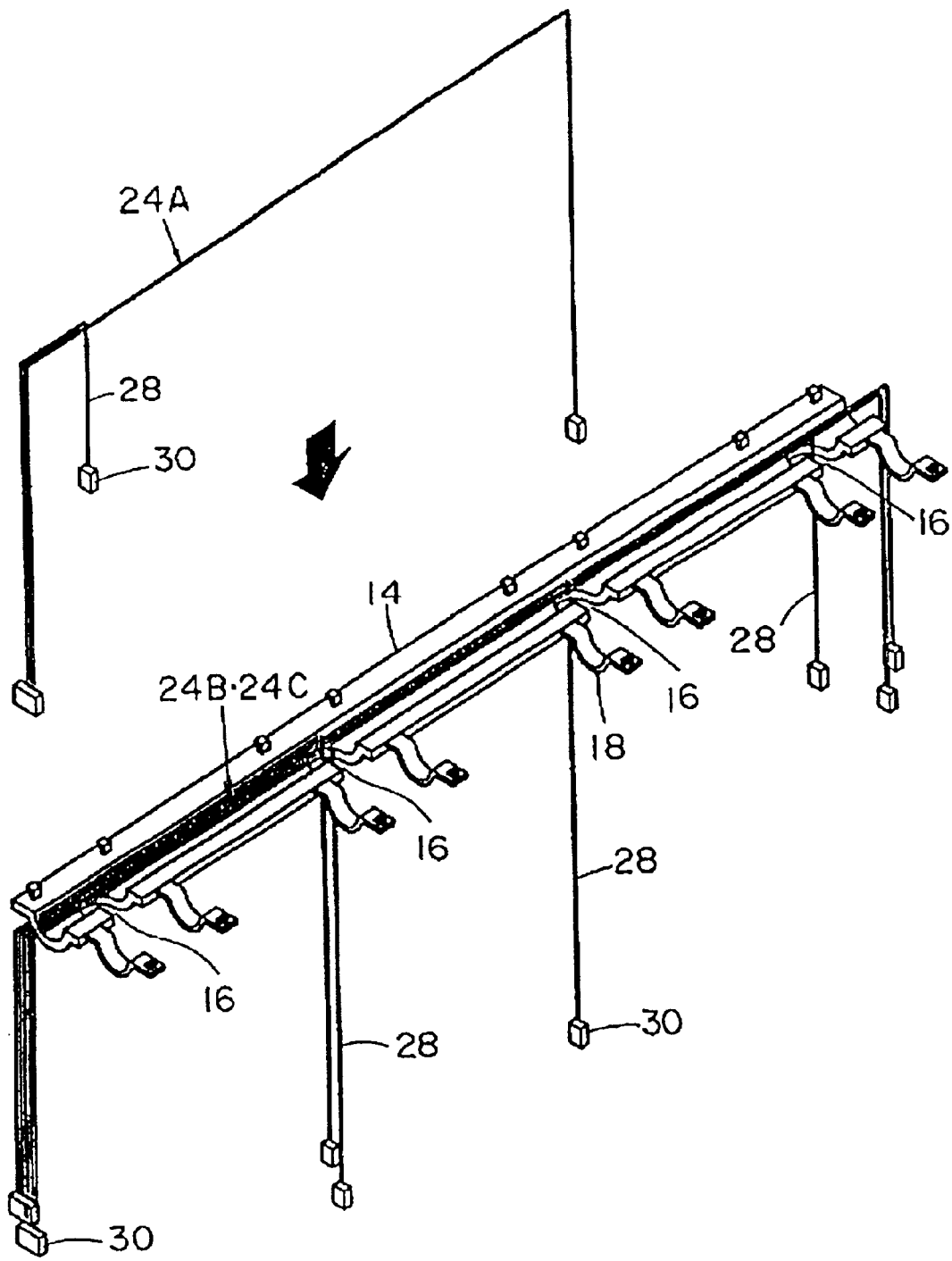
FIG. 4 is a perspective view showing how the sub wire harness shown in FIG. 2 is attached to the wire harness holding portion shown in FIG. 1.

FIG. 4 shows how the sub wire harnesses 24A through 24C separately produced as shown in FIG. 2 are attached to the wire harness holding portion 14 provided in the air conditioning duct 10 of FIG. 1 (The air conditioning duct 10 and the reinforcing bar 12 are not shown). Cabling is effected such that the trunk portions 26 of the sub wire harnesses 24A through 24C extend along the wire harness holding portion 14, and that the branch portions 28 are passed through the cutouts 16. The cabling of the sub wire harnesses 24A through 24C may be effected one by one or collectively. When there are a large number of sub wire harnesses, the cabling may be performed in groups of two to three.

When, as in the case of the example shown, there are a plurality of cutouts 16 for positioning, it is convenient to give different colors to the edges of the cutouts 16 and to attach tapes of corresponding colors to the branch portions 28 of the sub wire harnesses. This makes it possible to effect cabling such that the branch portions 28 and the cutouts 16 are respectively in color correspondence with each other, enabling the cabling of the branch potions to be effected correctly. If a branch portion is arranged in a wrong cutout, that can be easily noticed.

When giving different colors to the edges of the plurality of cutouts 16, the same effect can be obtained by coloring the connectors 30 at the forward ends of the branch portions in colors in correspondence with the colors of the cutouts 16, instead attaching colored tapes to the branch portions.

Figure 5:
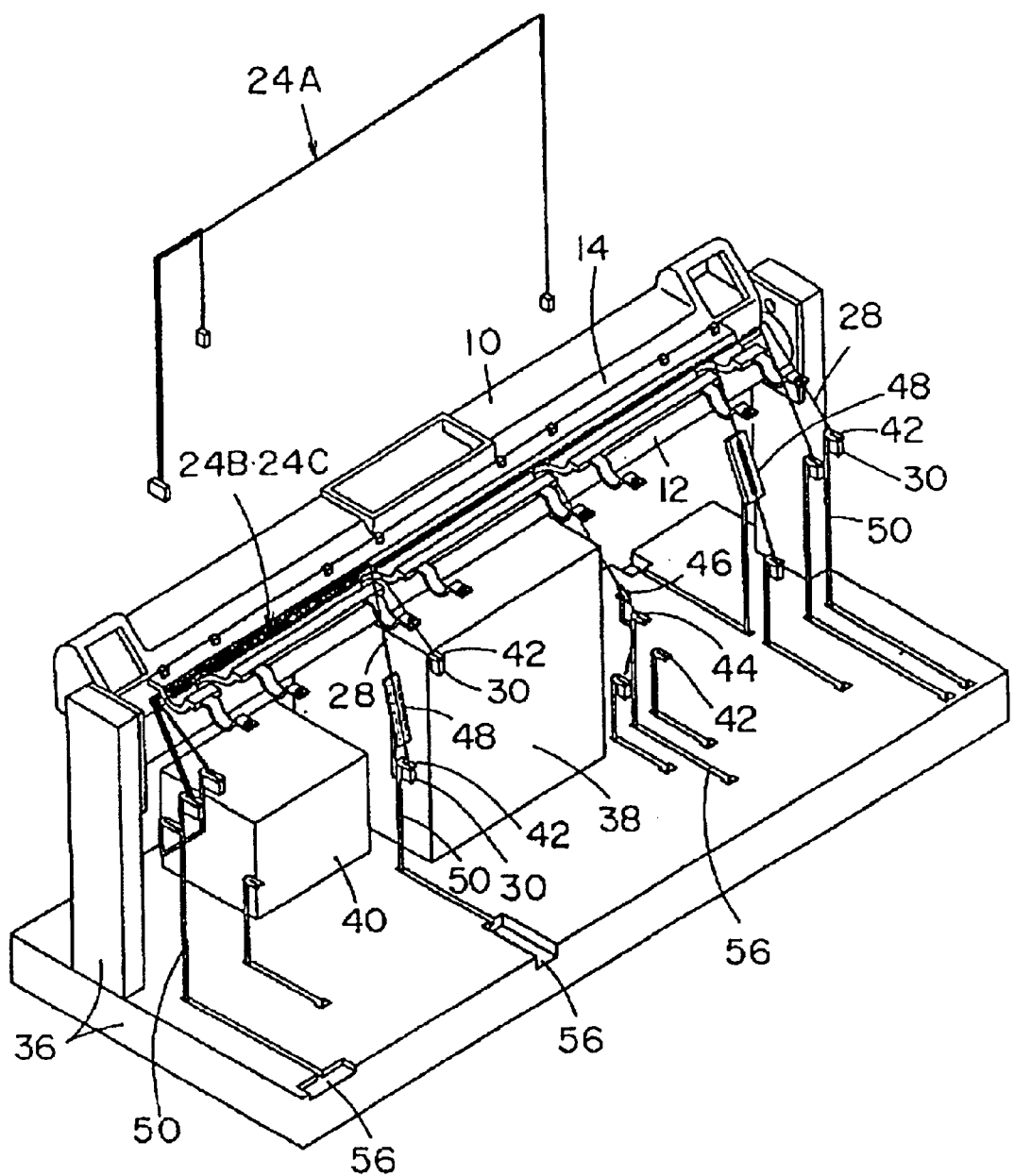
FIG. 5 is a perspective view showing how the air conditioning duct provided with the wire harness holding portion of FIG. 1 is placed on an instrument panel module assembly stand, and the sub wire harness of FIG. 2 is attached.

When performing the cabling of the sub wire harnesses 24A through 24C on the wire harness holding portion 14, it is desirable to perform the cabling in a state in which, as shown in FIG. 5, the air conditioning duct 10 and the reinforcing bar 12 are placed on an instrument panel module assembly stand 36. Also set in the assembly stand 36 are other instrument panel module components, such as an air conditioning unit 38 and a blower unit 40. Further, in the assembly stand 36, connector temporary fixing jigs 42, jigs 44 for temporarily fixing the branching-off portions of the branch portions, exterior component temporary fixing jigs 46, exterior component mounting indication plates 48, etc. are arranged at predetermined positions, each supported by a column 50.

It is also possible for the connector temporary fixing jigs 42 to be mounted to the air conditioning unit 38, etc., which are instrument panel module components.

The cabling of the sub wire harnesses 24A through 24C is effected, with the connectors 30 being set in the connector temporary fixing jigs 42 in order to adapt the dimensions of the branch portions (the length between the trunk portion 26 and the connector 30 at the forward end of the branch portion 28) to the requisite predetermined length when the wire harness is finally completed, whereby the predetermined dimension of the branch portions is ensured.

Figure 6:
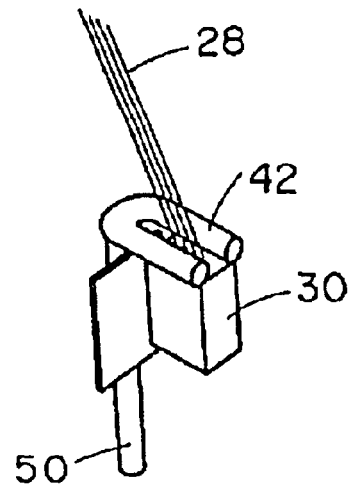
FIG. 6 is a perspective view showing a connector temporary fixing jig installed on the instrument panel module assembly stand of FIG. 5.
Figure 7:
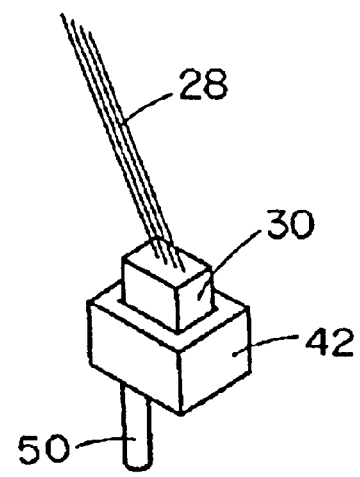
FIG. 7 is a perspective view showing another example of the connector temporary fixing jig.

The connector temporary fixing jigs 42 should allow the connectors 30 to be easily detached or temporarily fixed. Preferably, they are formed, for example, by bending round metal bars into a U-shape, as shown in FIG. 6. The connector temporary fixing jigs 42 should be large enough not to allow the connector 30 engaged therewith to be detached if pulled from the branch portion 28 side. The jigs 44 for temporarily fixing the branching-off portions of the branch portions may also have the same structure.

When installing two or more connector temporary fixing jigs close to each other, it is necessary for the connectors to be temporarily connected at the right positions. In this regard, it is convenient for each connector temporary fixing jig 42 to be formed as a resin case having a recess large enough to accommodate the associated connector 30. In that case, however, it is necessary for the adjacent connectors to be of different configurations.

Figure 8:
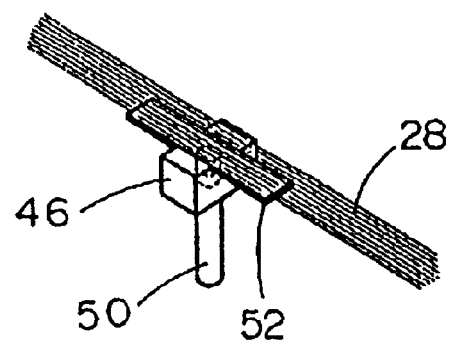
FIG. 8 is a perspective view showing an exterior component contemporary fixing jig installed on the instrument panel module assembly stand of FIG. 5.

FIG. 8 shows an example of the configuration of the exterior component temporary fixing jig 46. In this case, the exterior component is a clip 52 for fixing a part of the wire harness to a stationary body (e.g., an instrument panel main body). Such clip 52 has an anchor portion (indicated by the dashed line), which is inserted into a hole of the exterior component temporary fixing jig 46 to thereby temporarily fix the clip 52; after the completion of the cabling of the sub wire harnesses, the wire receiving portion of the clip 52 and the branch portion 28 of the wire harness are collectively tied by a tape, whereby it is possible to mount the clip 52 at a predetermined position of the branch portion 28.

Figure 9:
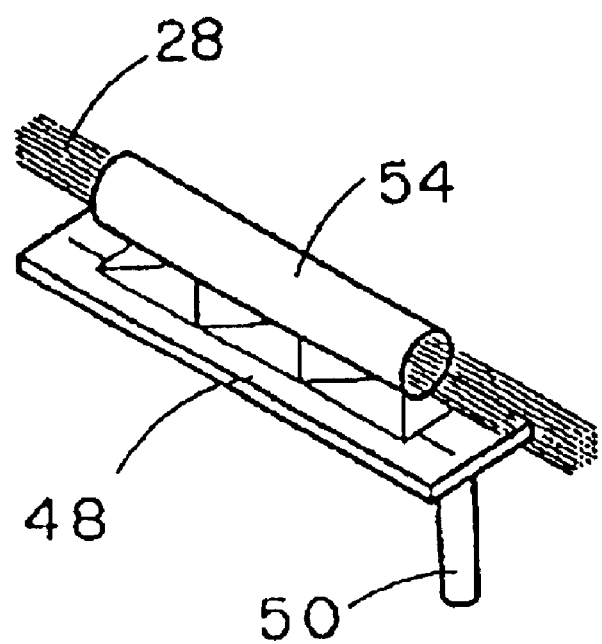
FIG. 9 is a perspective view showing an exterior component mounting indication table installed on the instrument panel module assembly stand of FIG. 5.

As shown in FIG. 9, the exterior component mounting indication plate 48 indicates the configuration, mounting direction, position, etc. of an exterior component 54 mounted to the wire harness.

The exterior component 54 mounted to the wire harness consists of a wire tying tape, wire protecting tube, protector or the like. At the stage where the cabling of all the sub wire harnesses 24A through 24C has been completed, with the connectors 30 being set in the connector temporary fixing jigs 42, the operator mounts the exterior components 54 to the branch portions 28 in accordance with the indication plates 48.

The columns 50 supporting the connector temporary fixing jigs 42, the exterior component mounting indication plates 48, etc. can be tilted in one direction around their lower ends, and formed in the assembly stand 36 are grooves 56 for accommodating the columns 50 and the temporary fixing jigs 42, 44, and 46 and the indication plates 48 supported thereby (See FIG. 5). Thus, temporary fixing jigs, etc. not to be used can be accommodated in the grooves 56 by tilting the columns 50.

Figure 10:
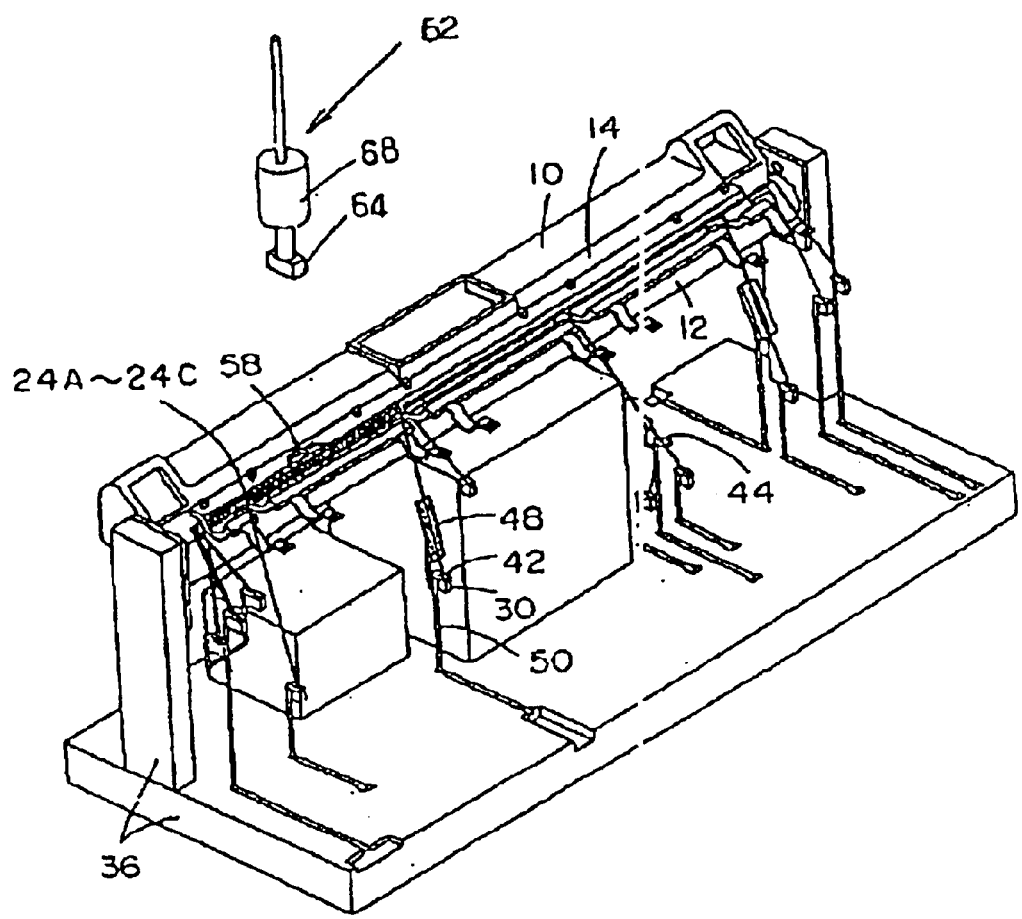
FIG. 10 is a perspective view showing how the wire of a sub wire harness is connected by a press contact connector on the instrument panel module assembly stand of FIG. 5.

In assembling a wire harness, it is sometimes necessary to connect wires of different sub wire harnesses to each other. When using a press contact connector for this connection, a press contact connector 58 is integrally mounted to the wire harness holding portion 14 as shown in FIGS. 10 and 11; the wires 60 to be connected are set in the press contact connector 58, and press contact connection is effected on the wire harness holding portion 14.

Figure 11:
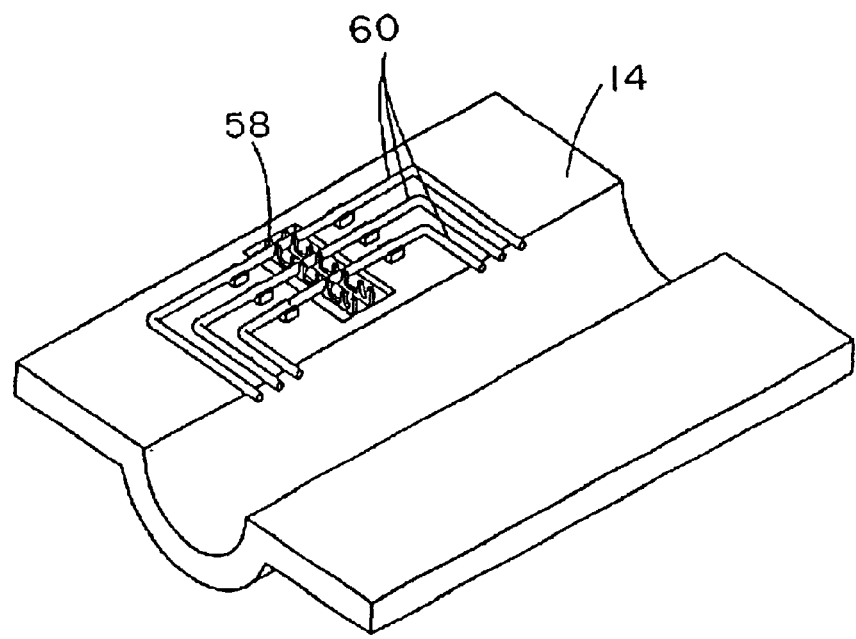
FIG. 11 is an enlarged perspective view of the press contact connector portion of FIG. 10.

In this case, as shown in FIG. 11, the press contact connector 58 is installed such that the openings of the press contact teeth are directed upwards, enabling the wires 60 to be easily arranged on the press contact teeth. As shown in FIG. 10, above the instrument panel module assembly stand 36, there is installed a press contact connector fitting machine 62. The press contact fitting machine 62 is a well-known one. In the example shown, it is composed of a press contact head 64 for forcing the associated force-in member (not shown) into the press contact connector 58, a cylinder 68 for lowering the same, etc.

The connection of the wires 60 by the press contact connector 58 is effected by forcing the wires 60 into the press contact teeth by the press contact fitting machine 62 after the cabling of all the sub wire harnesses 24A through 24C has been completed and after the wires 60 of the circuits to be connected of the sub wire harnesses 24A through 24C have been arranged on the press contact teeth of the press contact connector 58.

Figure 12:
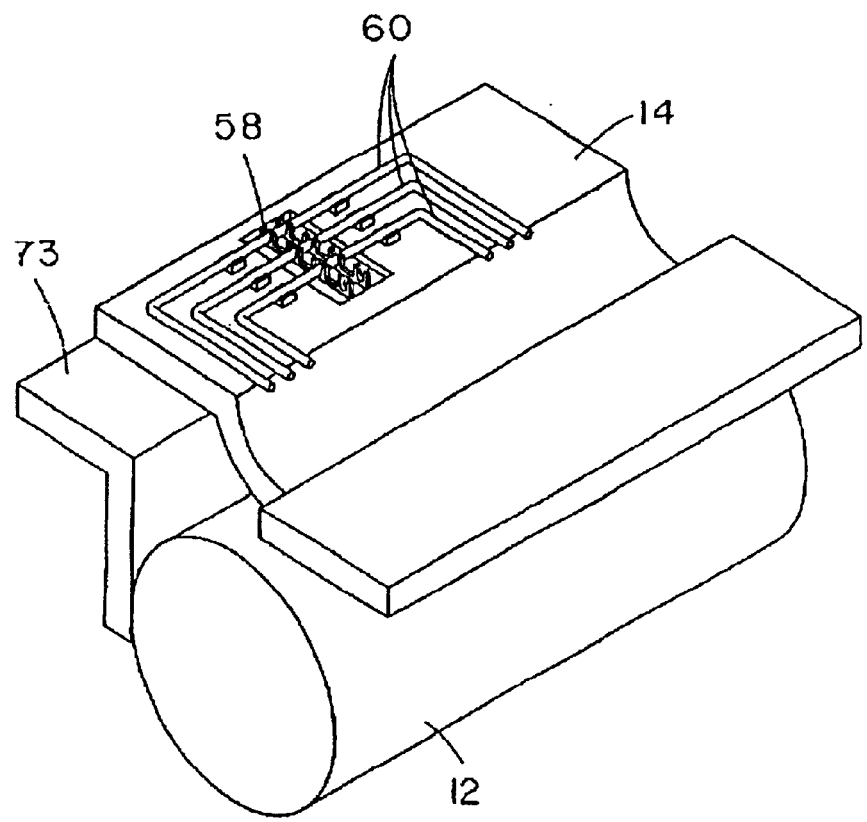
FIG. 12 is a perspective view showing an example in which the wire harness holding portion to which the press contact connector is mounted is reinforced by a reinforcing plate.
Figure 13:
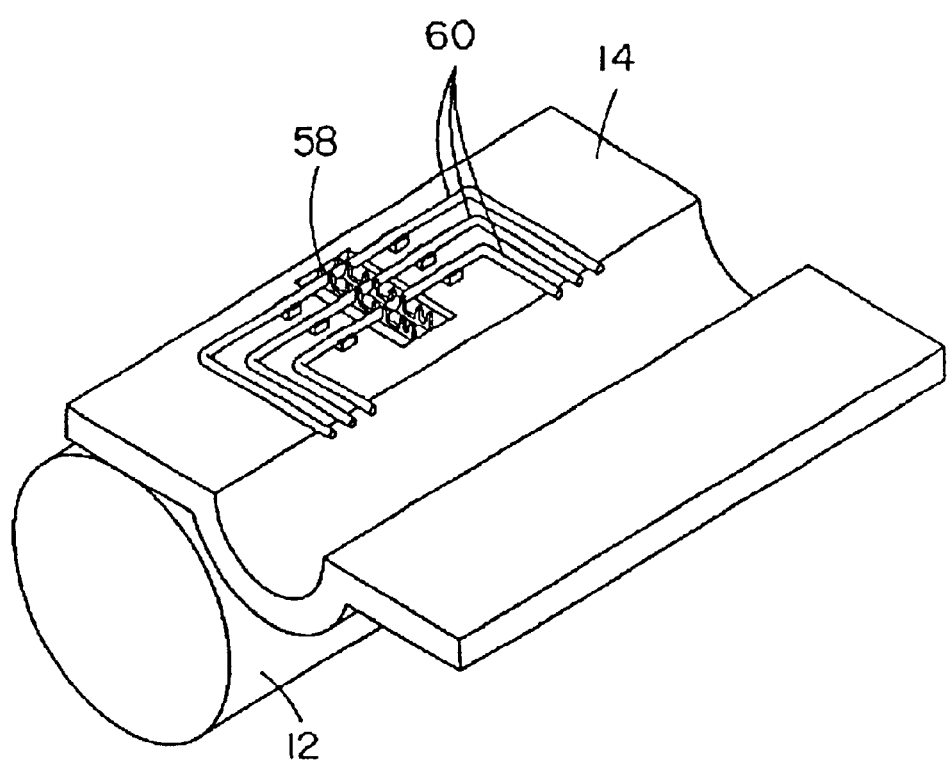
FIG. 13 is a perspective view showing an example in which the wire harness holding portion to which the press contact connector is mounted is mounted to a reinforcing bar.

As shown in FIG. 12, a metal reinforcing plate 73 is advantageously provided on the back side of the portion of the wire harness holding portion 14 where the press contact connector 58 is fixed so that it can withstand the external force applied when effecting press contact fitting. The reinforcing plate 73 is fastened, for example, to the reinforcing bar 12. As shown in FIG. 13, it is also possible for the portion of the wire harness holding portion 14 where the press contact connector 58 is fixed to be positioned on the reinforcing bar 12.

Figure 14:
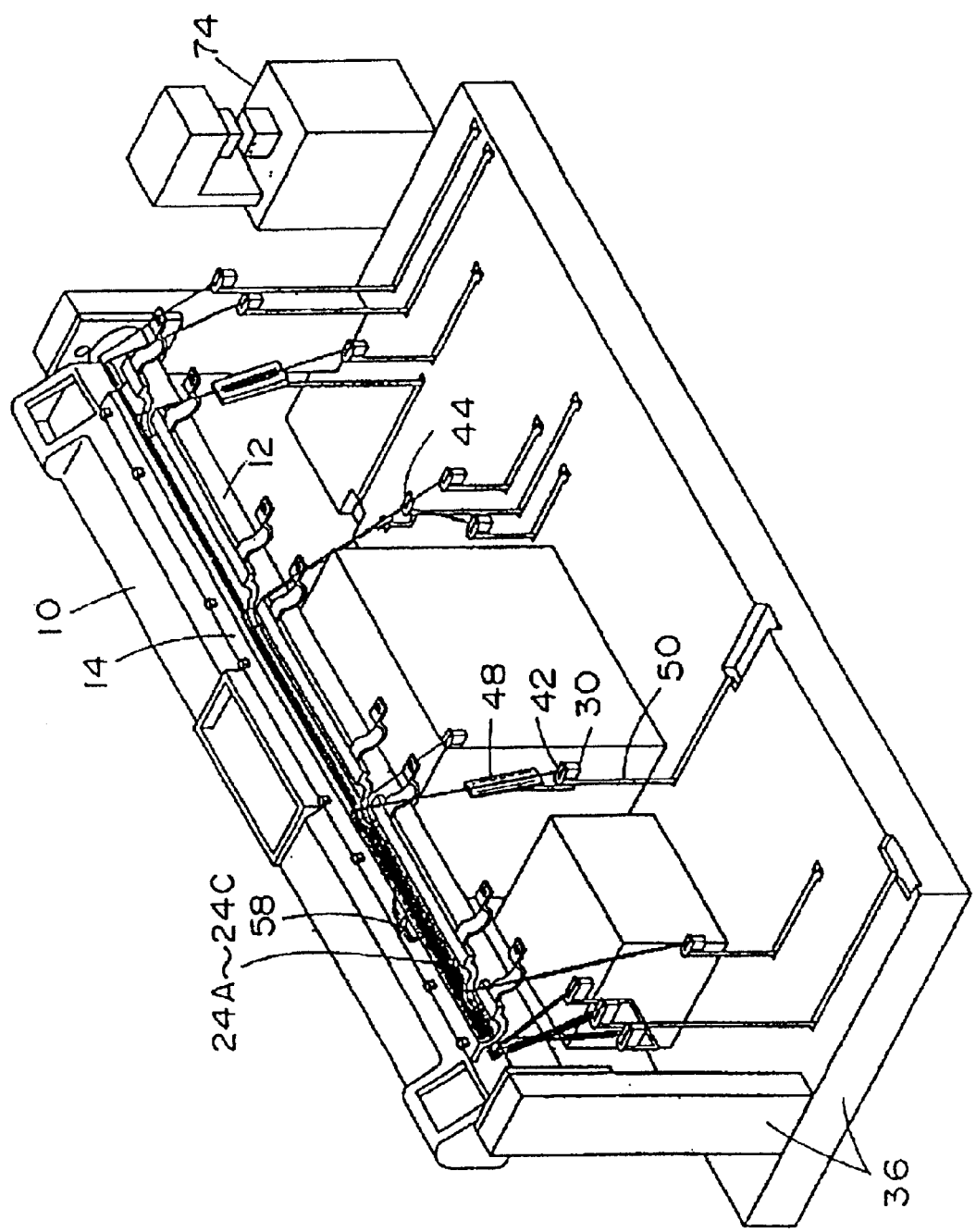
FIG. 14 is a perspective view showing a state in which a welder for connecting the wire of a sub wire harness by welding is installed beside the instrument panel module assembly stand.

When welding connection is adopted in connecting wires to each other between different sub wire harnesses, a welding machine 74 is installed, for example, beside the instrument panel module assembly stand 36, as shown in FIG. 14, and the wire terminals to be connected are collectively welded by this welding machine 74. It is also possible for the welding machine 74 to be installed on the assembly stand 36.

After the cabling of all the sub wire harnesses 24A through 24C has been completed as shown in FIG. 14, the terminal portions of the wires to be connected of the sub wire harnesses 24A through 24C are put together and placed in the welding machine 74 to collectively effect welding connection. The insulating coating is removed from the terminal portions of the wires to be connected by welding to expose the conductors. The wires to be connected by welding are preferably arranged in the sub wire harnesses such that their terminal portions are concentrated in predetermined terminal portions of predetermined branch portions of the sub wire harnesses.

Figure 15:
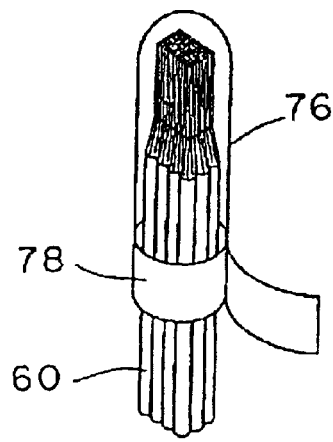
FIG. 15 is a perspective view showing a state in which insulation processing is performed on a wire connected by welding by means of the welder of FIG. 14.

As shown in FIG. 15, after the welding, an insulating cap 76 is fitted onto the welding connection portions of the wires 60, and fixing is effected by an insulating tape 78 to thereby effect insulating processing.

Figure 16:
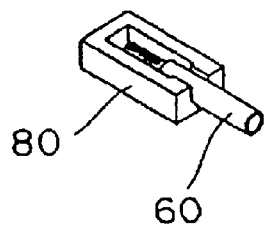
FIG. 16 is a perspective view showing an example of how a wire terminal portion is protected until welding.

At the stage where the sub wire harnesses are produced, the insulating coating is removed from the terminal portions of the wires to be connected by welding, the conductors at the terminal ends being exposed until welding connection is effected. As shown in FIG. 16, to protect the exposed conductors, a protecting member 80 is mounted to the end portion of each wire 60 at the stage where the insulating coating is removed in producing the sub wire harnesses. When performing welding connection, this protecting member 80 is removed.

As is apparent from the above description, in this embodiment, the cabling of all the sub wire harnesses 24A through 24C is effected on the wire harness holding portion 14 while temporarily fixing the connectors 30 of the sub wire harnesses 24A through 24C to the connector temporary fixing jigs 42, and fixing is effected by the fastening members 18. Then, the exterior components 54 are mounted to the branch portions 28 of the wire harnesses in accordance with the exterior component mounting indication plates 48. At the same time, the exterior components 52 are mounted to the branch portions 28 on the exterior component temporary fixing jigs 46. Further, as needed, press contact connection of the wires 60 by the press contact connector 58 and collective welding connection of the wires 60 by the welding machine 74 are effected. Finally, the connectors 30 are detached from the connector temporary fixing jigs 42, and the exterior components 52 are detached from the exterior component temporary fixing jigs 46, whereby the mounting of the wire harness is completed on the wire harness holding portion 14 provided on the air conditioning duct 10. Thus, it is possible to omit the conventional wire harness assembly process.

Figure 17:
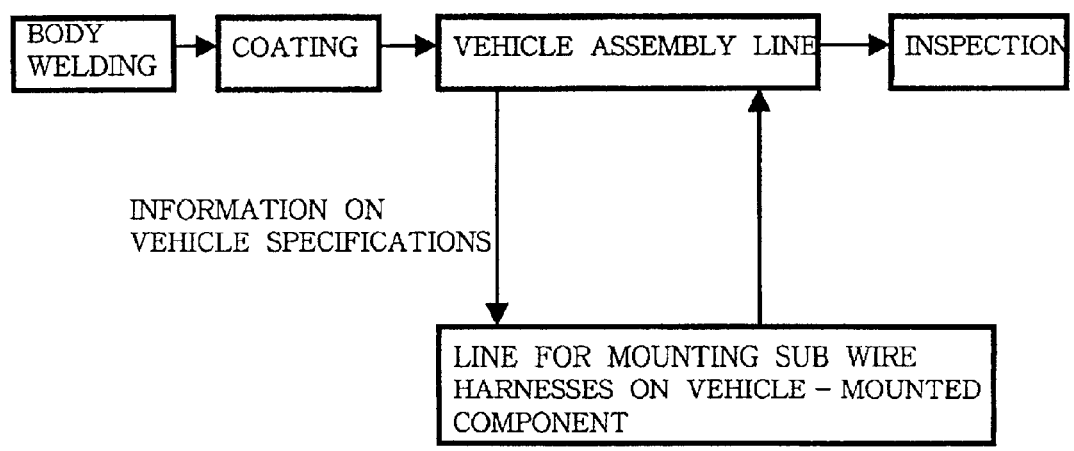
FIG. 17 is a block diagram showing the relationship between a vehicle assembly line and a line for mounting a sub wire harness to a vehicle-mounted component.

As shown in FIG. 17, it is desirable for the cabling of the sub wire harnesses on the wire harness holding portion, which is a vehicle-mounted component, to be performed in parallel with the assembly of the vehicle in accordance with information on the vehicle specifications of the vehicle to be produced in the vehicle assembly line. This is due to the following circumstances. Generally speaking, the production of automobiles is conducted according to various grades and variations. Such variations include those in coating colors and interior colors. Regarding specifications in electrical wiring, it is necessary to take into account engine type, transmission (manual or automatic), and the presence/absence of various kinds of electrical equipment, such as a power window. Such specifications are supplied to the vehicle assembly line when producing a vehicle in accordance with vehicle order information. Even in the case of an ordinary vehicle, there are several thousands of variations in specifications, and there are several tens of kinds of wire harnesses for a portion. To produce vehicles of such varying specifications in a single line, an instruction sheet indicating the specifications is attached, for example, to the body of each vehicle in the assembly line at the start of production, and the operator mounts the requisite equipment in accordance with this instruction sheet. Thus, to assemble a wire harness in conformity with the specifications for a vehicle, information on the specifications of the next vehicle to be produced is obtained before the requisite time for the mounting of sub wire harnesses has elapsed, and sub wire harnesses are mounted to the vehicle-mounted components in accordance with the specifications.

Figure 18:
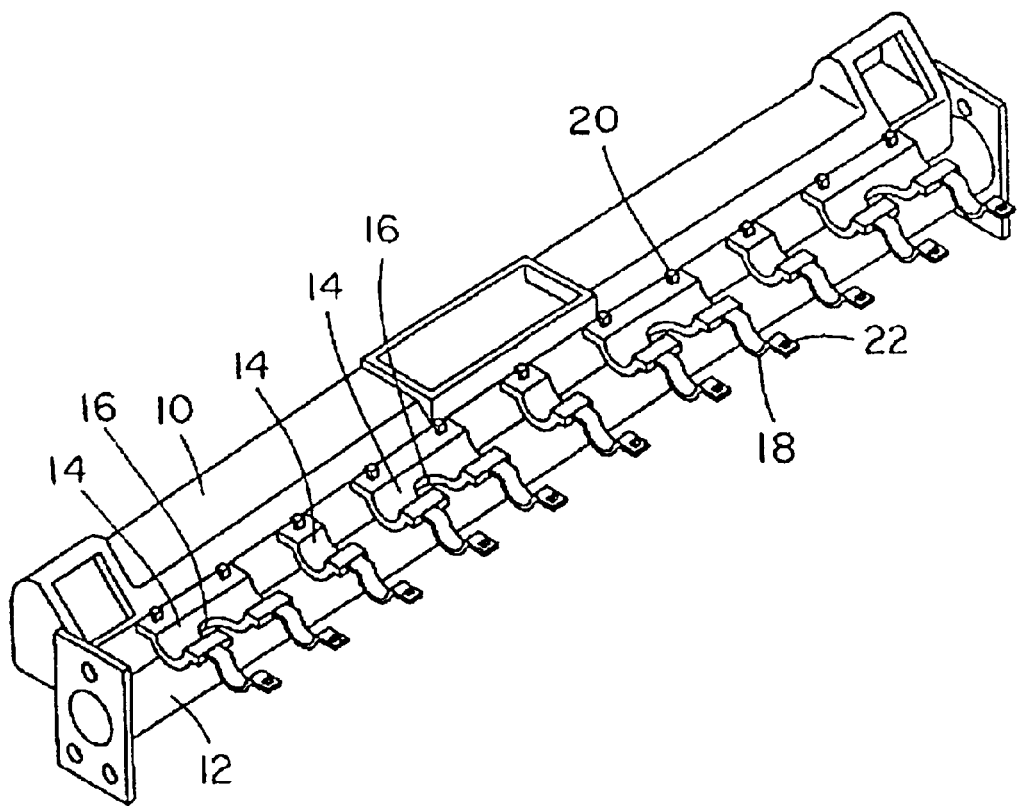
FIG. 18 is a perspective view showing another example of a wire harness holding portion provided in an air conditioning duct.

While in the above-described embodiment the wire harness holding portion 14 provided on the air conditioning duct 10 assumes the form as shown in FIG. 1, it is possible for the wire harness holding portion 14 to assume some other form. For example, as shown in FIG. 18, a number of wire harness holding portions 14 may be arranged in the longitudinal direction of the air conditioning duct 10. These wire harness holding portions 14 are provided at least at the branching-off portions where the branch portions branch off from the trunk portion of the wire harness, and between branching-off portions as needed. In FIG. 18, the components which are the same as those of FIG. 1 are indicated by the same reference numerals (This also applies to the following drawings).

Figure 19:
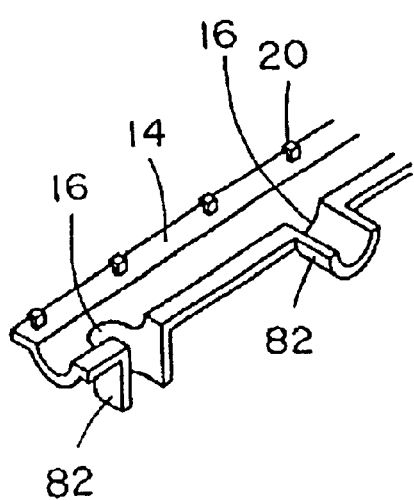
FIG. 19 is a perspective view showing still another example of a wire harness holding portion.

Further, as shown in FIG. 19, the wire harness holding portion 14 preferably has a guide portion 82 extending in the branch portion lead-out direction at the edge of the cutout 16 for the positioning of a wire harness branch portion. The provision of this guide portion 82 helps to stabilize the branching portion lead-out direction. By fastening the branching portion to the guide portion 82 by means of tape winding or the like, the branching portion lead-out direction is further stabilized.

Figure 20:
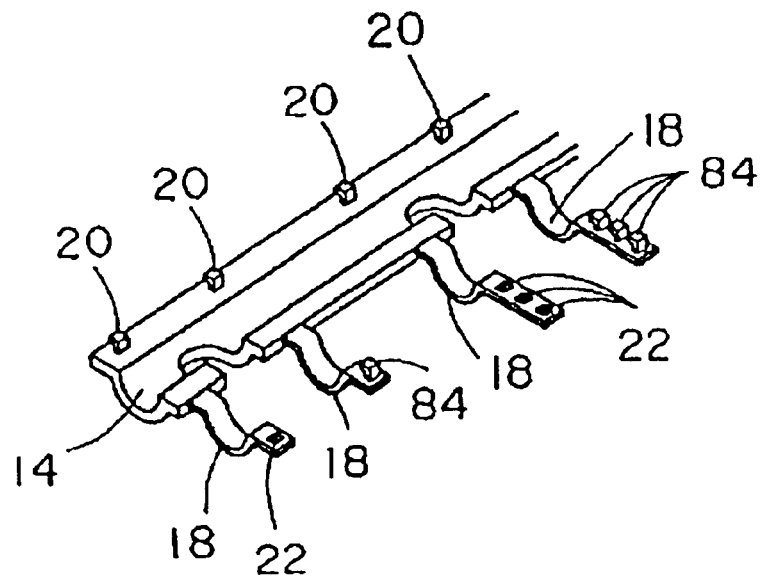
FIG. 20 is a perspective view showing still another example of a wire harness holding portion.

Further, as shown in FIG. 20, the engagement portions of the fastening members 18 to be engaged with engagement protrusions 20 provided on one side of the wire harness holding portion 14 may be holes 22 or hook-like protrusions 84. In particular, when a plurality of holes 22 or hook-like protrusions 84 are formed in the end portion of a fastening member 18, it is possible to vary the position where it is engaged with the associated engagement protrusion 20 according to the thickness of the wire harness mounted to the wire harness holding portion 14, making it possible to appropriately adjust the fastening condition.

Figure 21:
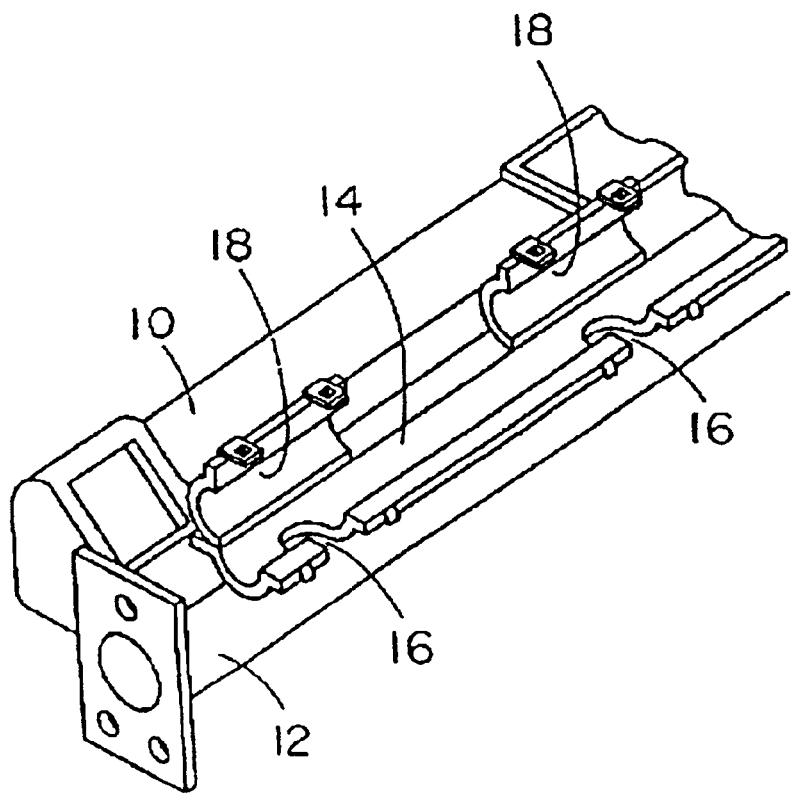
FIG. 21 is a perspective view showing still another example of a wire harness holding portion.
Figure 22:
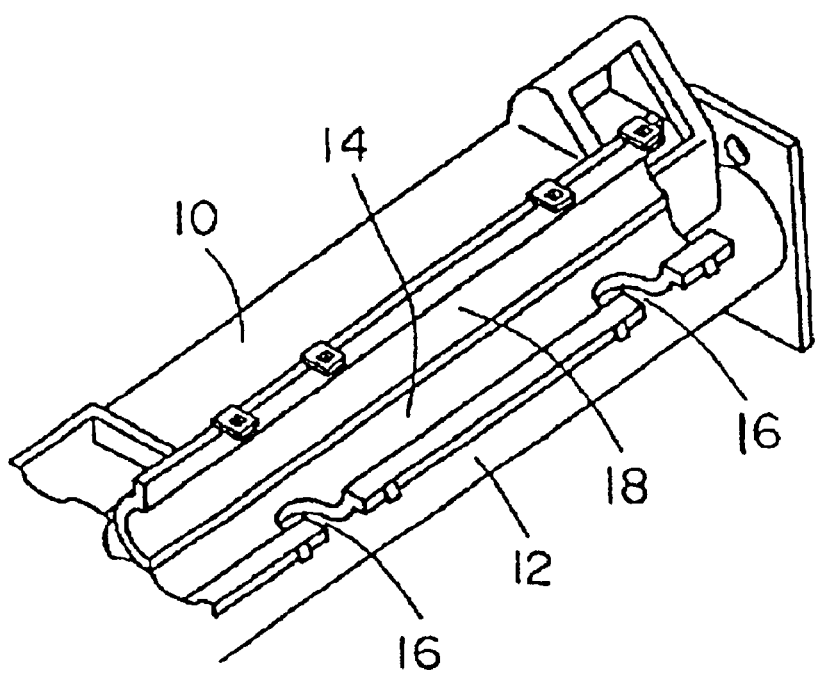
FIG. 22 is a perspective view showing still another example of a wire harness holding portion.

Further, as shown in FIG. 21, the fastening members 18 may be formed so as to partly cover the branching-off portions of the wire harness arranged on the wire harness holding portion 14. Further, as shown in FIG. 22, the fastening member 18 may be formed so as to entirely cover the wire harness arranged on the wire harness holding portion 14.

While in the above-described embodiment the wire harness holding portion is provided on an air conditioning duct, it is also possible to provide the wire harness holding portion on the reinforcing bar or the instrument panel main body, arranging the sub wire harnesses on the reinforcing bar side or the instrument panel main body side.

Figure 23:
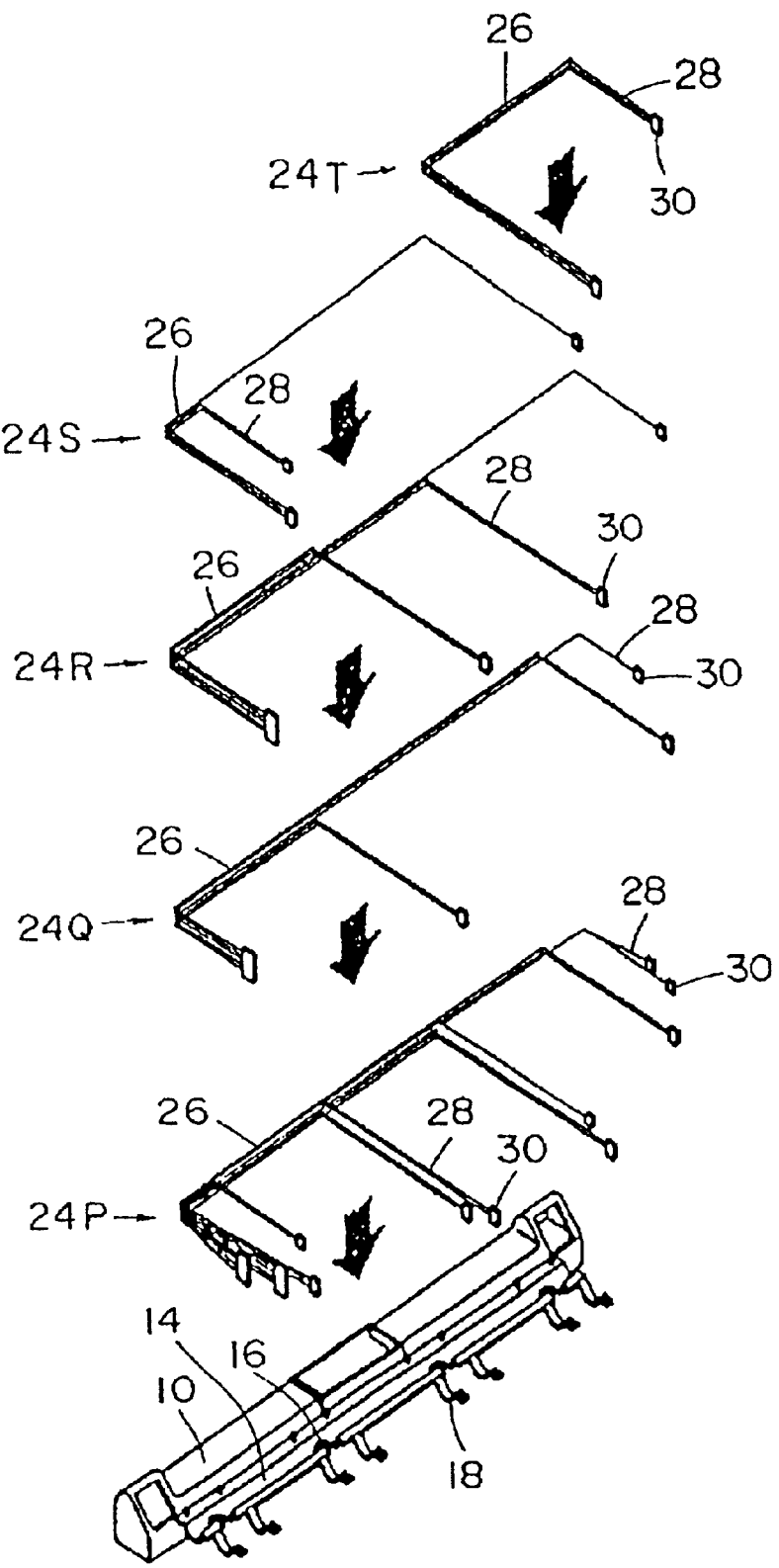
FIG. 23 is a perspective view showing another embodiment of a wire harness mounting method according to the present invention.

FIG. 23 shows another embodiment of the present invention. In this embodiment also, the wire harness is mounted to the air conditioning duct 10, which is a vehicle-mounted component (The reinforcing bar is not shown). As in the above-described embodiment, the air conditioning duct 10 is provided with the wire harness holding portion 14, which is provided with the cutouts 16 for the positioning of the wire harness branching portions, and the fastening members 18 for fixing the wire harness.

The wire harness mounted to the wire harness holding portion 14 is produced in separate parts: one single common base sub harness 24P and four option sub harnesses 24Q through 24T. In the sub harnesses 24P through 24T, numeral 26 indicates trunk portions, numeral 28 indicates branch portions, and numeral 30 indicates connectors (Tying members are not shown).

The common base sub harness 24P consists of a collection of circuits to be commonly used for a plurality of specifications for a plurality of vehicle types or a single vehicle type. For example, it includes an engine control circuit, an illuminating system circuit, a meter indication common portion circuit, and a circuit for safety equipment, such as an air bag. Further, while it depends on the degree of commonness, in the case where an air conditioner, etc. are standard equipment, the air conditioner circuit is also included in the common base sub harness.

The option sub harnesses 24Q through 24T are collections of circuits for specific vehicle types or certain specifications. The option sub harnesses 24Q through 24T include the following circuits.

The first option sub harness 24Q is a circuit for, for example, an automatic transmission vehicle. This sub harness 24Q has a connector for connection to an engine computer and a connector for connection to a meter. The common base sub harness 24P also has a connector for connection to the engine computer and a connector for connection to the meter. Thus, it is necessary to respectively connect the connectors for connection to the engine computer of the common base sub harness 24P and the first option sub harness 24Q to the engine computer, and to respectively connect the connectors for connection to the meter of the two sub harness to the meter, resulting in an increase in the number of connectors. If, in this case, connectors of the two sub harnesses connected to the same element are inserted into one connector holder, or connectors of the two sub harnesses connected to the same element are integrated with each other, it is possible to perform the connection to the engine computer or the meter through one connector as in the prior art.

The second option sub harness 24R is used for a remote control mirror circuit.

The third option sub harness 24S is used for a power window circuit.

The fourth option sub harness 24T is used for a front fog lamp circuit.

Although not shown, apart from the above, there exist an option sub harness for a rear fog lamp circuit, an option sub harness for a head lamp leveling circuit, etc. In the case of this embodiment, the specifications required of the wire harness are as follows: an automatic transmission vehicle equipped with a remote control mirror, a power window, and a front fog lamp. Thus, apart from the common base sub harness 24P, four option sub harnesses 24Q through 24T are selected and mounted.

These option sub harnesses 24Q through 24T are connected to the requisite circuit of the common base sub harness 24P by putting at least one connector in a joint box or a joint connector or by means of a welding joint or the like, and are connected to the requisite power source, ground, and signal.

Figure 24:
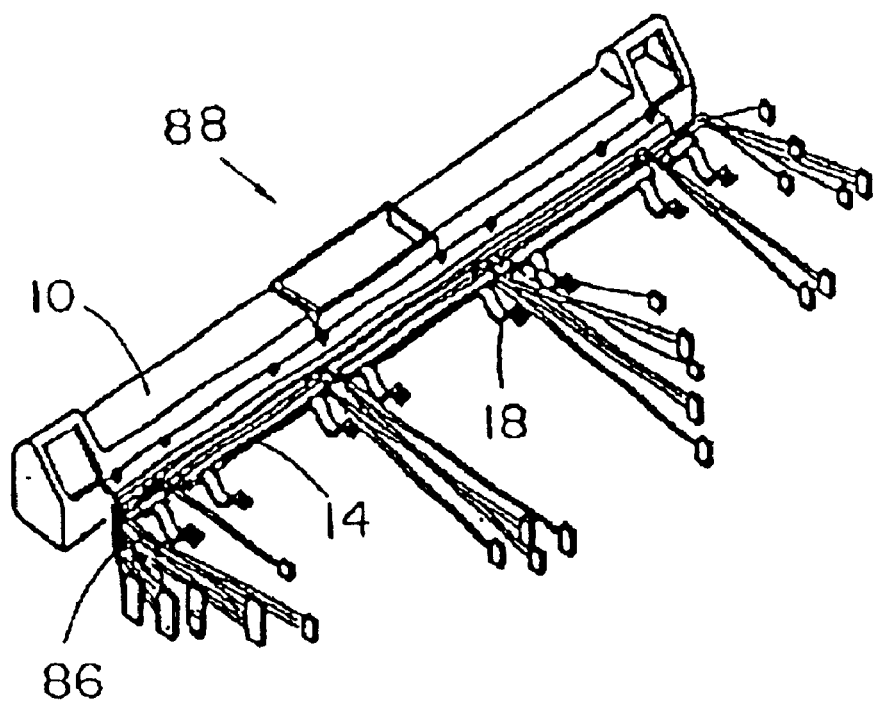
FIG. 24 is a perspective view showing how a wire harness is mounted to an air conditioning duct by the method shown in FIG. 23.

When the cabling of the common base sub harness 24P and the option sub harnesses 24Q through 24T on the wire harness holding portion 14 of the air conditioning duct 10 has been completed, one-unit wire harness 86 is completed, as shown in FIG. 24. Thereafter, by fastening the wire harness 86 to the wire harness holding portion 14 by means of the fastening members 18, a composite component 88 in which the air conditioning duct 10 and the wire harness 86 are integrated with each other is completed.

Figure 25:
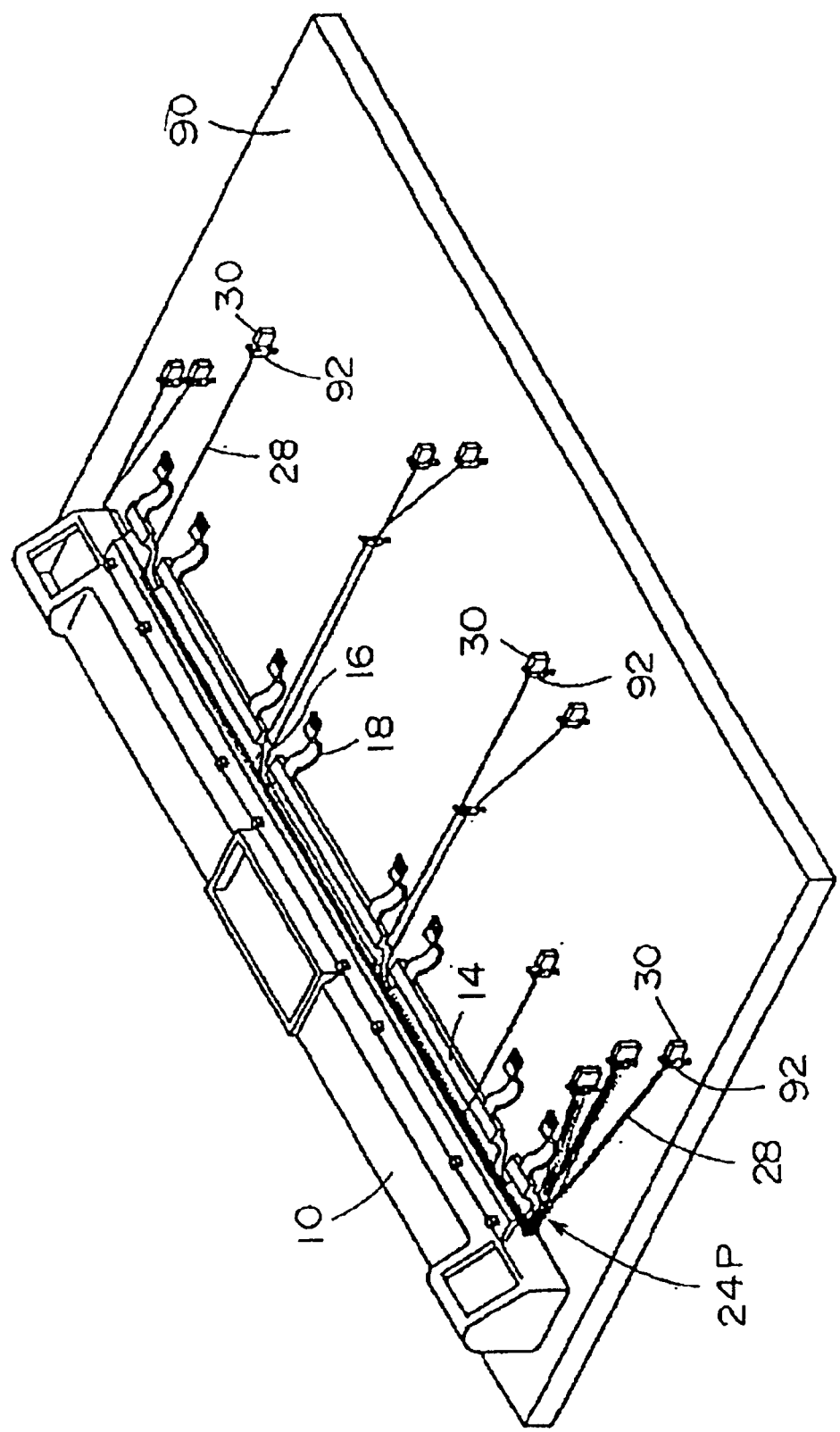
FIG. 25 is a perspective view showing still another embodiment of the wire harness mounting method of the present invention.

When the assembly of this composite component 88 is conducted, with the air conditioning duct 10 (vehicle-mounted component) being arranged on a wire harness assembly wiring table 90, as shown in FIG. 25, the assembly can be executed efficiently. FIG. 25 shows a state in which, after arranging the air conditioning duct 10 at a predetermined position on the wiring table 90, the common base sub harness 24P is first arranged in the wiring path of the wiring table 90 including the wire harness holding portion 14 of the air conditioning duct 10. The connectors 30 at the ends of the common base sub harness 24P are held by connector receiving jigs 92 mounted at predetermined positions of the wiring table 90. The connector receiving jigs 92 also serve as continuity inspection jigs.

After arranging the common base sub harness 24P as shown in FIG. 25, the option sub harnesses 24Q through 24T shown in FIG. 23 are successively arranged in a similar manner. When the wiring of all the sub harnesses 24P through 24T has been completed, the wire harness trunk portion on the wire harness holding portion 14 is wrapped in a soft sheet, and is fixed as it is by the fastening members 18. Those branch portions of the common base sub harness 24P and the option sub harnesses 24Q through 24T which extend through the same path are put together and undergo sheathing processing such as tape winding or corrugate tube attachment.

In this embodiment, all the connectors 30 are held by the connector receiving jigs 92 also serving as continuity inspection jigs, so that the length of the branch portions 28 can beset correctly. Further, by performing continuity inspection after the wiring of all the sub harnesses 24P through 24T, it is possible to complete the inspection of the wire harness. When the wire harness thus mounted to the air conditioning duct 10 is detached from the wiring table 90 along with the air conditioning duct 10, a composite component in which the wire harness and the air conditioning duct are integrated with each other is completed.

It is desirable for the wiring of the sub wire harnesses on the wire harness holding portion, which is a vehicle-mounted component, and on the wiring table to be conducted in parallel with the assembly of the vehicle in accordance with obtained information on the specifications of the vehicle in the vehicle assembly line. The reason for this is the same as that in the above-described embodiment.

As described above, in accordance with the first embodiment of the present invention, instead of assembling the sub wire harnesses produced in the sub wire harness production process into a wire harness on the harness assembly wiring table, the sub wire harnesses are directly arranged on the vehicle-mounted component or the wire harness holding portion provided on the vehicle body to be assembled into a wire harness, so that it is possible to substantially reduce the requisite space for wire harness assembly.

In the prior art technique, the sub wire harnesses produced by the automatic sub wire harness producing machine are respectively arranged on the harness assembly wiring table and assembled. Then, the wire harness is detached from the harness assembly wiring table and mounted again to a vehicle-mounted component or the like. In the present invention, a substantial reduction is achieved in terms of assembly and mounting processes, so that it is possible to reduce the cost for processing the wire harness, thereby achieving a reduction in cost.

Further, there is no need for the harness assembly wiring table, the stand for securing it in position, the conveyor for moving the harness assembly wiring table, etc., which have been necessary in the conventional harness assembly process, so that it is possible to substantially reduce the equipment cost.

Further, two or more sub harnesses are classified into a common base sub harness common to a plurality of vehicle types or a plurality of specifications of a single vehicle type and option sub harnesses to be used for specific vehicle types or certain specifications, and the common base sub harness and the option sub harnesses are appropriately combined for mounting in accordance with the vehicle type or specifications, whereby it is possible to substantially reduce the product number of the wire harness, and the minimum requisite circuits for the vehicle specifications are combined, so that it is possible to incorporate an optimum circuit into a vehicle without paying any particular attention to the product number, thereby effectively achieving a reduction in cost and weight.

Further, the vehicle-mounted component is arranged on the wire harness assembly wiring table, and the wiring on the wiring table is effected while mounting the sub harnesses to the vehicle-mounted component, whereby it is possible to complete the mounting to the vehicle-mounted component simultaneously with the wiring of the sub harnesses, and the wiring of the sub harnesses can be effected substantially in a plane, thereby enabling the operation to be conducted efficiently. Further, since the branch portions can be secured in a state in which they are stretched in a plane, the requisite dimensional accuracy for the branch portions can be easily ensured, and continuity inspection can be advantageously conducted using the existing equipment.

(Second Embodiment)

When mounting the wire harness directly to the wire harness holding portion of the vehicle component, of the connectors mounted to the forward ends of the branch lines of the wire harness, those connectors to be connected to a vehicle component constituting a module may be directly connected to the vehicle component, whereby it is also possible to ensure the prescribed branch line length. However, among the connectors mounted to the forward ends of the branch lines of the wire harness, there exist connectors to be connected to the associated elements after the module assembled has been mounted on the vehicle. At the module assembly stage, there are no associated elements to which these connectors are to be connected, so that these connectors are left dangling, making it difficult to ensure the prescribed branch line length (When the connectors are not secured in position, the branch lines can be drawn by the trunk line to be reduced in length).

To eliminate this problem, it might be possible to provide connector temporary fixing jigs on the module assembly stand, and to temporarily fix thereto the connectors with no associated elements to thereby ensure the prescribed branch line length. This method, however, makes it necessary to three-dimensionally arrange the connector temporary fixing jigs on the module assembly stand, resulting in a very complicated jig design. Moreover, the connector temporary fixing jigs jumbled up on the module assembly stand would hinder the module assembly operation. Further, when, after the module assembly, the connectors are detached from the temporary fixing jigs, the connectors will again be left dangling, so that some measure must be taken for this, with the result that a lot of time and labor is required.

In accordance with the second embodiment of the present invention, there is provided a vehicle component module with a wire harness mounted thereto in which the above-mentioned problems have been eliminated.

Figure 26:
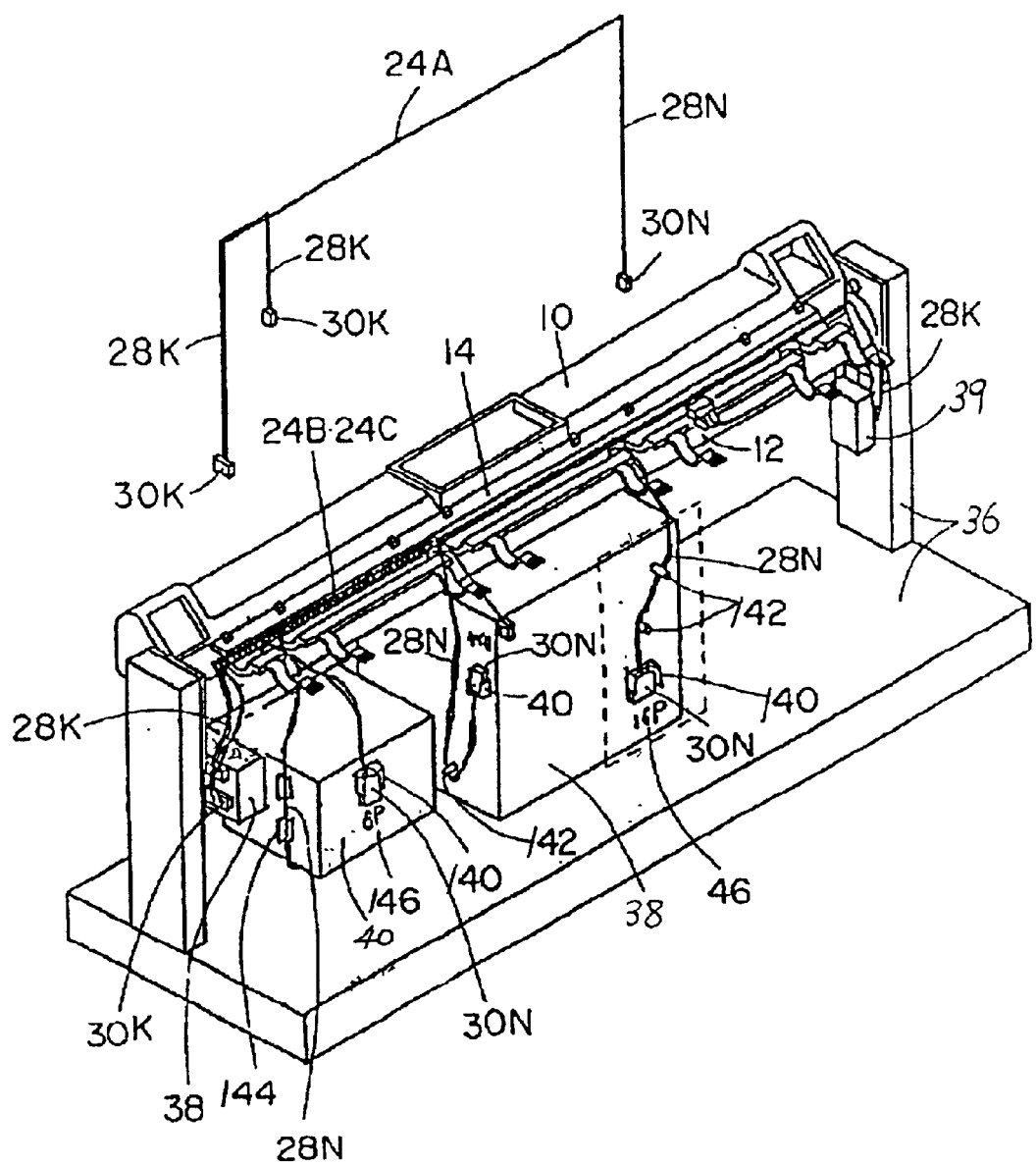
FIG. 26 is a perspective view showing a state in which a wire harness mounting vehicle component module according to an embodiment of the present invention is being assembled.

FIG. 26 shows an embodiment of the present invention. FIG. 26 shows a state in which the air conditioning duct 10 and the reinforcing bar 12 as shown in FIG. 1 are placed on a module assembly stand 36, and vehicle components, such as an air conditioning unit 38, a blower unit 40, and an electrical connection box 39, are mounted thereto, and further, a plurality of sub wire harnesses 24A through 24C are mounted to assemble a vehicle component module with a wire harness mounted thereto.

The sub wire harnesses 24A through 24C consist of a common base sub harness having a collection of circuits to be commonly used in a plurality of vehicle types or a plurality of specifications of a single vehicle type and option sub harnesses having a collection of at least one circuit to be used in a specific vehicle type or certain specifications, these sub harnesses being appropriately combined with each other to constitute one wire harness set according to the vehicle type or specifications. When the sub wire harnesses are thus directly mounted, it is possible to omit the harness assembly process. Further, it is possible to incorporate a wire harness in conformity with the vehicle product number into the module, whereby the wire harness product number is eliminated. Further, it is possible to eliminate the so-called "mounted-for-nothing" circuits which have been added in order to reduce the wire harness product number.

The trunk portions of the sub wire harnesses 24A through 24C are mounted to the wire harness holding portion 14 of the air conditioning duct 10. Of the connectors mounted to the forward ends of the sub wire harnesses 24A through 24C, the connectors which are connected to vehicle components at the module assembly stage, that is, the connectors 30K (which are shown only partially) to be connected to the air conditioning unit 38, the blower unit 40, and the electrical connection box 39, are connected at this stage to the associated connectors. By connecting the connectors 30K to the associated connectors, the prescribed lengths of the branch lines 28K having the connectors 30K are ensured.

Among the connectors of the sub wire harnesses 24A through 24C, there exist connectors 30N which have no associated elements to which they are to be connected at the module assembly stage (connectors to be connected to the associated elements after the module has been mounted to the vehicle). Temporary locking means 140 for temporarily locking such connectors 30N are formed on the outer surfaces of the air conditioning unit 38 and the blower unit 40. In this embodiment, each of these temporary locking means 140 is in the form of a pair of protrusions, between which the connector 30N is fitted in to thereby temporarily lock the connector 30N.

Figure 27:
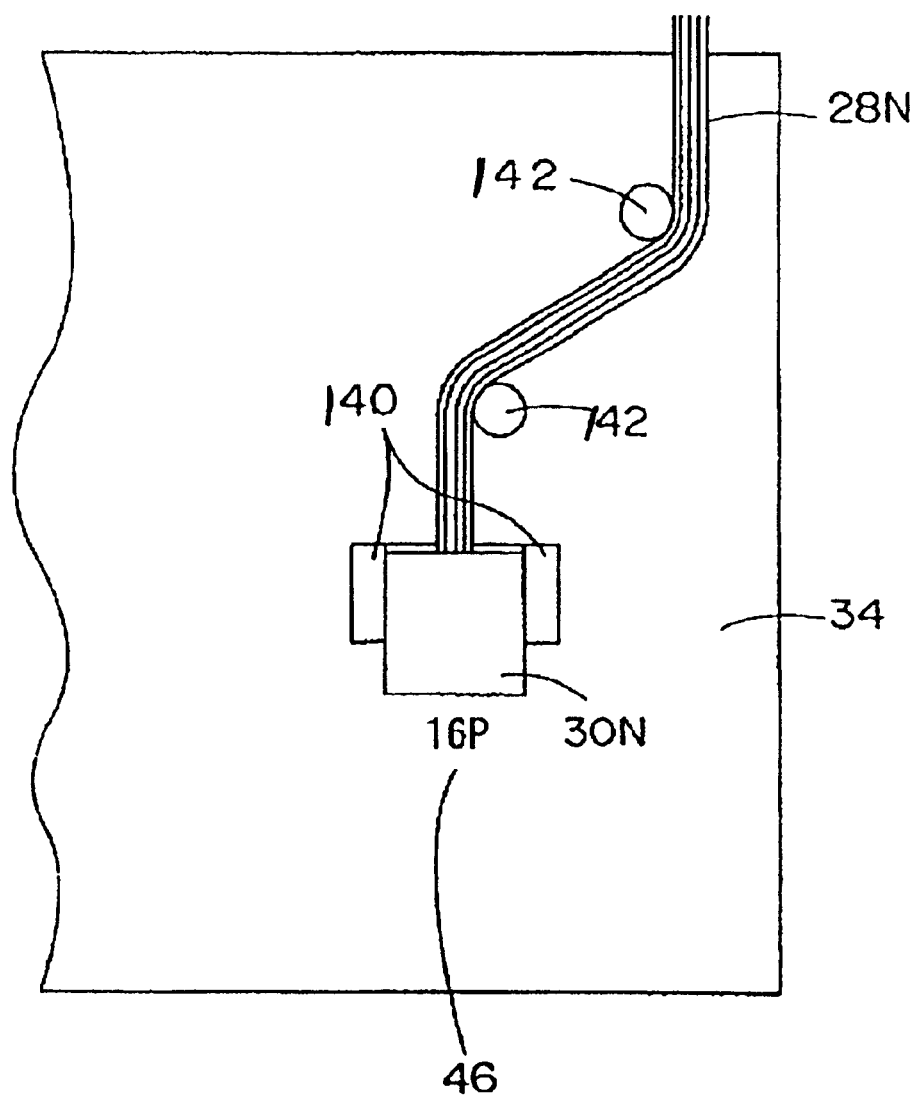
FIG. 27 is an enlarged front view of a portion surrounded by the dashed line in FIG. 26.

Further, on the outer surface of the air conditioning unit 38, there are formed branch line holding means 142 for detour-wiring the branch line 28N when the branch line 28N of the connector 30N is long. FIG. 27 is an enlarged front view of the portion of FIG. 26 surrounded by the dashed line. These branch line temporary holding means 142 are so positioned that when the connector 30N is temporarily locked to the temporary locking means 140, the branch line 28N exhibits the prescribed length. In this embodiment, the branch line temporary holding means 142 are in the form of protrusions where the branch line 28 is bent.

On the outer surface of the blower unit 40, there are formed branch line temporary holding means 144 for restricting the wiring path of the branch line 28N. These branch line holding means 144 are in the form of guide walls for guiding the branch line 28N in the wiring direction.

The temporary locking means 140 and the branch line temporary holding means 144 can be formed integrally with the cases of the air conditioning unit 38 and the blow unit 40, which are formed by injection molding.

In order that the temporary locking operation may be executed efficiently and correctly, it is desirable to provide on the outer surfaces of the air conditioning unit 38 and the blower unit 40 marks 146 (16P, 6P, etc.) indicating the temporary locking positions for the connectors 30N. Further, in order that the cabling operation may be executed efficiently and correctly, it is also desirable to provide on the outer surfaces of the air conditioning unit 38 and the blower unit 40 marks (not shown) indicating the cabling path for the branch line 28N.

As described above, in accordance with the second embodiment of the present invention, when assembling a vehicle component module with a wire harness mounted thereto, it is possible to temporarily lock the connectors with no associated elements at the module assembly stage to the vehicle component without using any special jig. Further, it is possible to maintain the prescribed length for the branch line corresponding to the connector. This makes it possible to assemble a vehicle component module with a wire harness mounted thereto easily and efficiently.

When the branch line corresponding to the connector with no associated element is long, a branch line temporary holding means for detour-wiring the branch line is provided on the outer surface of the vehicle component, whereby cabling is possible with the prescribed length of the branch line secured on the outer surface of the vehicle component. Further, by providing marks indicating the temporary locking positions for the connectors with no associated elements and marks indicating the cabling path for the branch lines corresponding to such connectors, it is possible to perform the temporary locking operation and cabling operation more efficiently and correctly.

(Third Embodiment)

Figure 28:
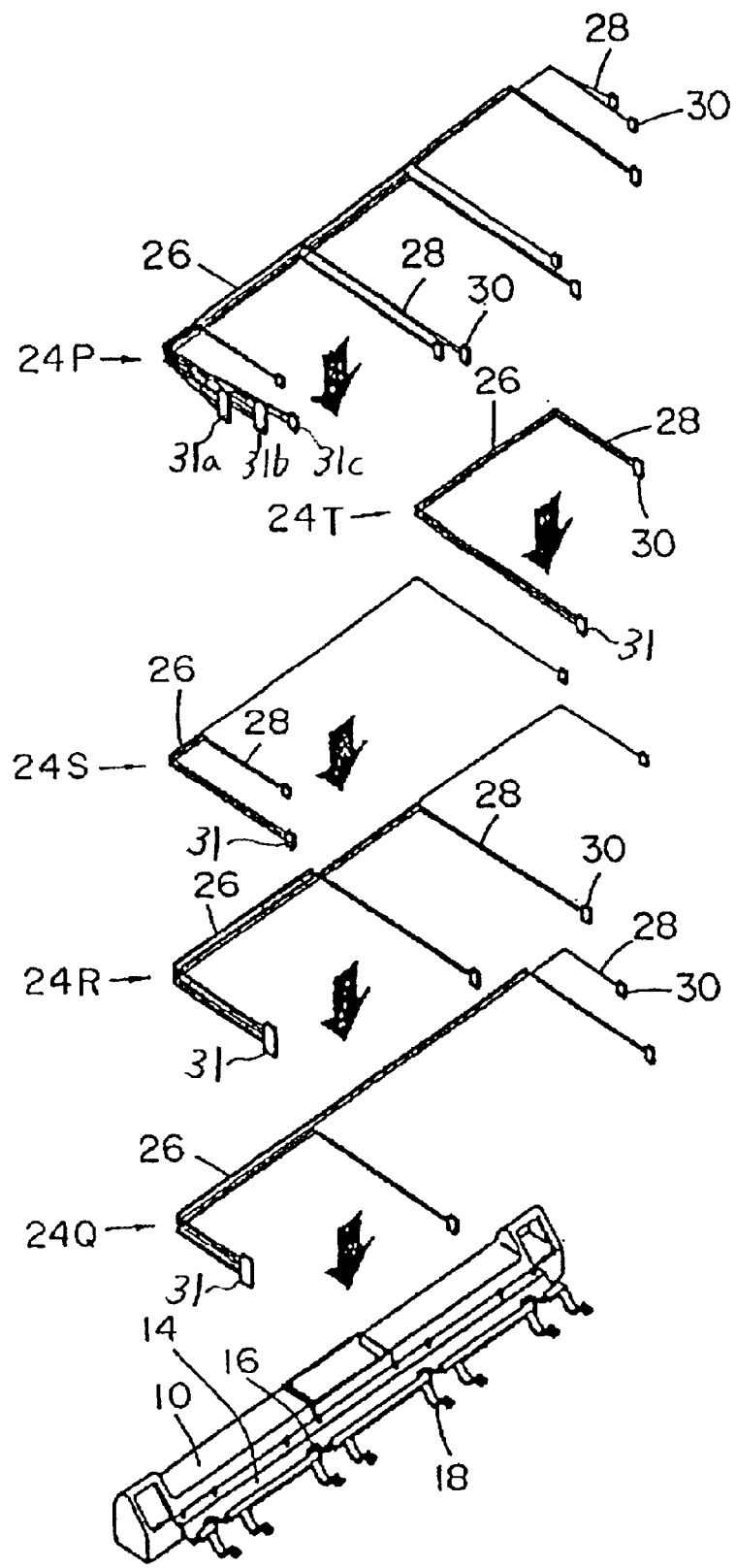
FIG. 28 is a perspective view showing a wire harness mounting method according to an embodiment of the present invention.

As shown in FIG. 28, the wire harness mounted to the wire harness holding portion 14 is produced in separate parts: one common base sub harness 24P and a plurality of (four in the example shown) option sub harnesses 24Q through 24T. In the sub harnesses 24P through 24T, numeral 26 indicates trunk portions, numeral 28 indicates branch portions, and numeral 30 indicates connectors (Tying members are not shown).

The common base sub harness 24P consists of a collection of circuits to be commonly used for a plurality of specifications for a plurality of vehicle types or a single vehicle type. For example, it includes an engine control circuit, an illuminating system circuit, a meter indication common portion circuit, and a circuit for safety equipment, such as an air bag. Further, while it depends on the degree of commonness, in the case where an air conditioner, etc. are standard equipment, the air conditioner circuit is also included in the common base sub harness.

The option sub harnesses 24Q through 24T are collections of circuits for specific vehicle types or certain specifications. The option sub harnesses 24Q through 24T include the following circuits.

The first option sub harness 24Q is a circuit for, for example, an automatic transmission vehicle. This sub harness 24Q has a connector for connection to an engine computer and a connector for connection to a meter. The common base sub harness 24P also has a connector for connection to the engine computer and a connector for connection to the meter. Thus, it is necessary to respectively connect the connectors for connection to the engine computer of the common base sub harness 24P and the first option sub harness 24Q to the engine computer, and to respectively connect the connectors for connection to the meter of the two sub harness to the meter, resulting in an increase in the number of connectors. If, in this case, connectors of the two sub harnesses connected to the same element are inserted into one connector holder, or connectors of the two sub harnesses connected to the same element are integrated with each other, it is possible to perform the connection to the engine computer or the meter through one connector as in the prior art.

The second option sub harness 24R is used for a remote control mirror circuit.

The third option sub harness 24S is used for a power window circuit.

The fourth option sub harness 24T is used for a front fog lamp circuit.

Although not shown, apart from the above, there exist an option sub harness for a rear fog lamp circuit, an option sub harness for a head lamp leveling circuit, etc. In the case of this embodiment, the specifications required of the wire harness are as follows: an automatic transmission vehicle equipped with a remote control mirror, a power window, and a front fog lamp. Thus, apart from the common base sub harness 24P, four option sub harnesses 24Q through 24T are selected and mounted.

These option sub harnesses 24Q through 24T are connected to the requisite circuit of the common base sub harness 24P by putting at least one connector in a joint box or a joint connector or by means of a welding joint or the like, and are connected to the requisite power source, ground, and signal.

When mounting the common base sub harness 24P and the option sub harnesses 24Q through 24T to the wire harness holding portion 14 of the air conditioning duct 10, the option sub harnesses 24Q through 24T are first successively mounted (There is no restriction regarding the order in which the option sub harnesses are mounted), and the common base sub harness is finally mounted. Due to this arrangement, the relatively thin option sub harnesses 24Q through 24T are arranged at the bottom of the wire harness holding portion 14, and the relatively thick common base sub harness 24P is placed thereon to press down the option sub harnesses 24Q through 24T, so that there is no danger of the thin option sub harnesses 24Q through 24T being allowed to stick out of the wire harness holding portion 14, making it possible to mount all the sub harnesses 24P through 24T in position.

Figure 29:
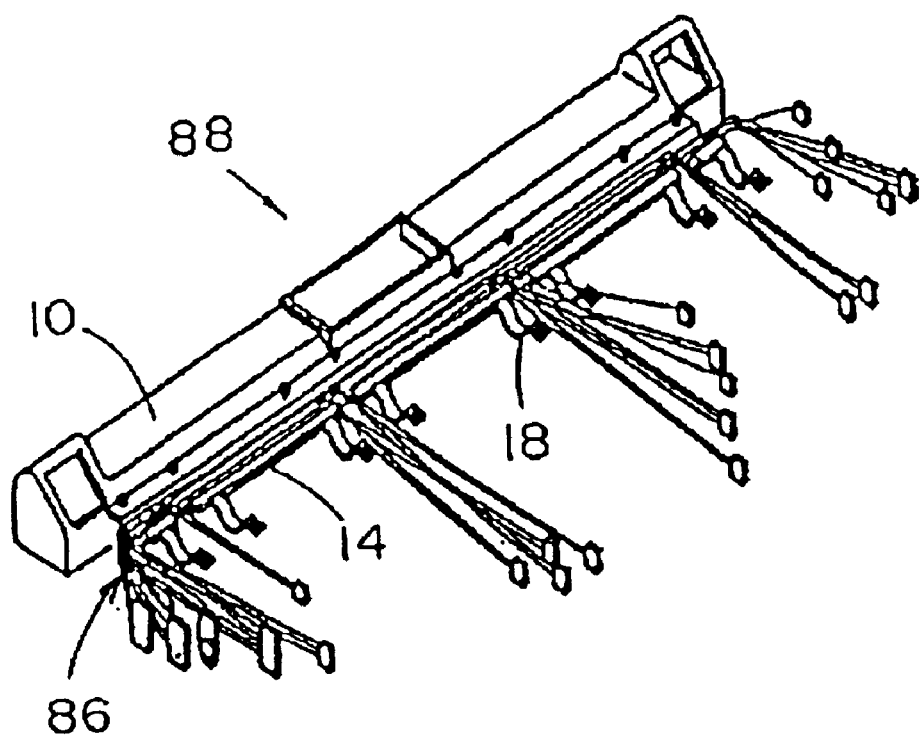
FIG. 29 is a perspective view showing a state in which a wire harness is mounted to an air conditioning duct by the method shown in FIG. 28.

When the mounting of all the sub harnesses 24P through 24T is thus completed, one wire harness unit 86 is completed on the wire harness holding portion 14, as shown in FIG. 29. Thereafter, the wire harness 86 is fixed to the wire harness holding portion 14 by the fastening members 18, whereby a composite component (module) 88 is completed, in which the air conditioning duct 10 and the wire harness 86 are integrated with each other.

Figure 30:
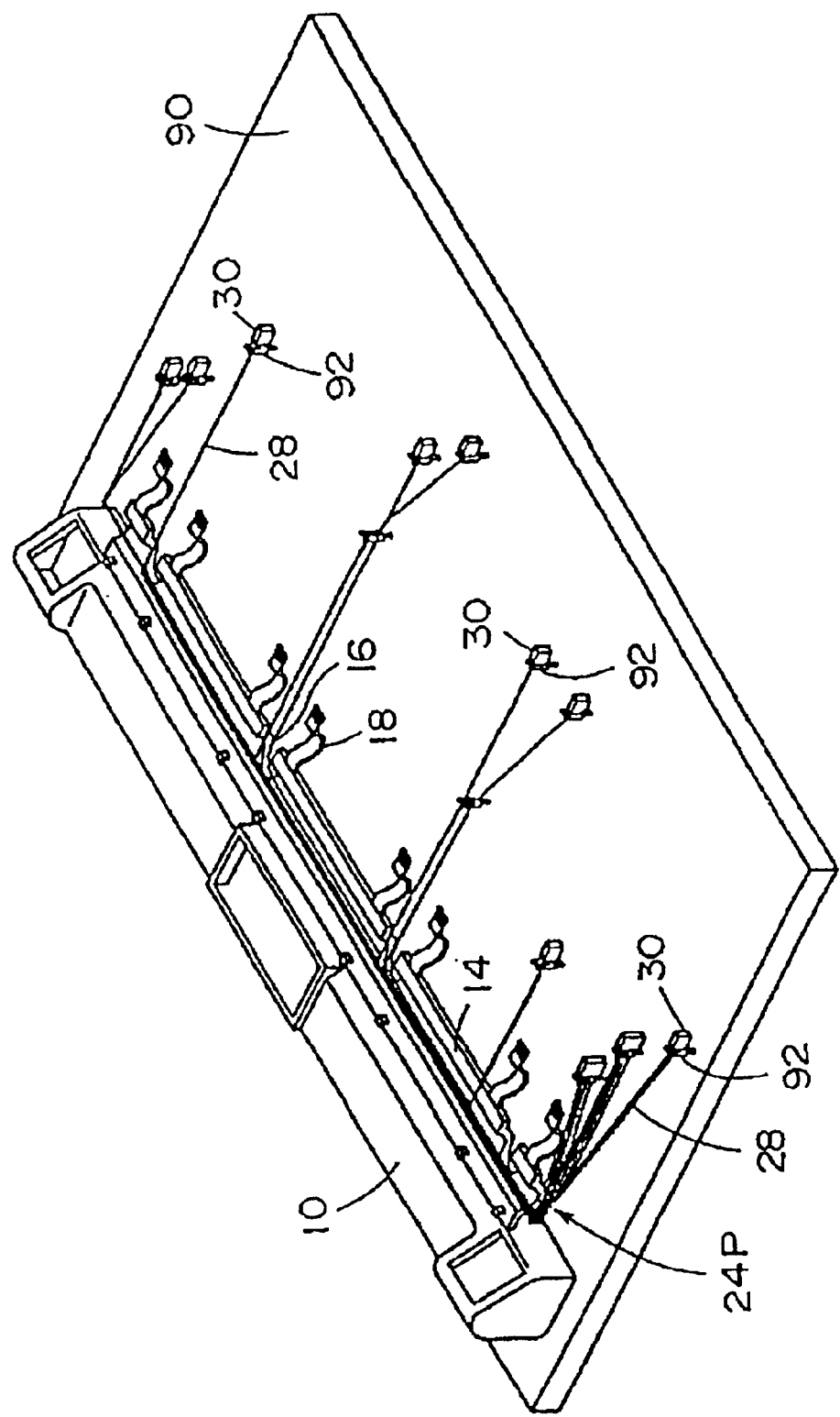
FIG. 30 is a perspective view showing another embodiment of the wire harness mounting method of the present invention.

As shown in FIG. 30, the assembly of this composite component 88 can be efficiently conducted, with the air conditioning duct 10 (vehicle-mounted component) being arranged on a wire harness assembly wiring table 90. FIG. 30 shows a state in which, after arranging the air conditioning duct at a predetermined position on the wiring table 90, the common base sub harness 24P is arranged in the wiring path of the wiring table 90 including the wire harness holding portion 14 of the air conditioning duct 10. Actually, as stated above, the common base sub harness 24P is finally arranged after the completion of the wiring of the option sub harnesses 24Q through 24T. Numeral 92 indicates connector temporary fixing jigs for holding the connectors 30 at the ends of the sub harnesses at predetermined positions on the wiring table 90. The connector temporary fixing jigs 92 also serve as continuity inspection jigs.

As shown in FIG. 30, the option sub harnesses 24Q through 24T shown in FIG. 29 are successively arranged on the wiring table 90 where the air conditioning duct 10 is arranged, and then the common base sub harness 24P is finally arranged. When the wiring of all the sub harnesses 24P through 24T has been completed, the trunk portion of the wire harness on the wire harness holding portion 14 is wrapped in a soft sheet, and fixed as it is by the fastening members 18. Those branch portions of the common base sub harness 24P and the option sub harnesses 24Q through 24T which extend through the same path are put together and undergo sheathing processing such as tape winding or corrugate tube attachment.

When the wiring of the sub harnesses 24P through 24T is thus conducted on the wiring table 90, all the connectors 30 are held by the connector temporary fixing jigs 92 also serving as continuity inspection jigs, so that it is possible to set the lengths of the branch portions 28 accurately. Further, by performing continuity inspection after the wiring of all the sub harnesses 24P through 24T, it is also possible to complete inspection on the wire harness. The wire harness thus mounted to the air conditioning duct 10 is detached from the wiring table 90 along with the air conditioning duct 10, whereby a composite component (module) can be obtained, in which the wire harness and the air conditioning duct are integrated with each other.

Figure 31:
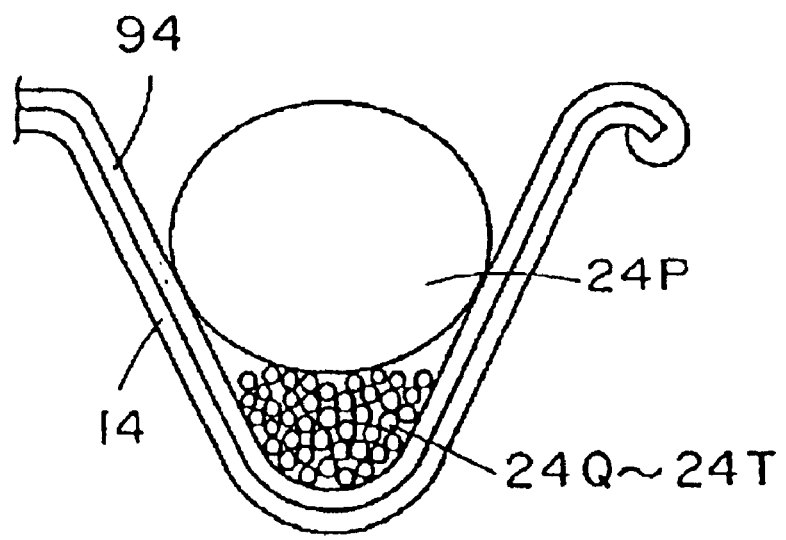
FIG. 31 is a sectional view showing a preferred embodiment of a wire harness holding portion used in a wire harness mounting method according to the present invention.

FIG. 31 shows a preferred embodiment of the wire harness holding portion provided on a vehicle-mounted component. This wire harness holding portion 14 has a substantially V-shaped sectional configuration whose bottom portion is rounded, and a soft sheet 94, such as a foam plastic sheet, is attached to the inner surface thereof.

Using this wire harness holding portion 14 having a substantially V-shaped sectional configuration, the option sub harnesses 24Q through 24T are first mounted, and the common base sub harness 24P is finally mounted. In this case, the thin option sub harnesses 24Q through 24T are easily gathered at the bottom of the wire harness holding portion 14, and the thick common base sub harness 24P is placed thereon to press them down, so that it is possible to prevent dislocation of the option sub harnesses 24Q through 24T and to prevent wire sticking out and noise generation. Further, by attaching the soft sheet 94 to the inner surface, it is possible to prevent damage to the wire and effectively prevent noise generation.

As described above, in accordance with the third embodiment, the sub wire harnesses produced in the sub wire harness production process are directly mounted to the wire harness holding portion provided on the vehicle-mounted component to assemble the wire harness. Thus, as compared with the prior art technique, in which the sub wire harnesses produced by the automatic sub wire harness producing machine are arranged on the harness assembly wiring table and assembled, and then the wire harness is detached from the harness assembly wiring table and mounted again to a vehicle-mounted component or the like, a substantial reduction is achieved in terms of assembly and mounting processes, so that it is possible to reduce the cost for processing the wire harness, thereby achieving a reduction in cost.

Further, the sub harnesses are classified into a common base sub harness common to a plurality of vehicle types or a plurality of specifications of a single vehicle type and option sub harnesses to be used for specific vehicle types or certain specifications, and the common base sub harness and the option sub harnesses are appropriately combined for mounting in accordance with the vehicle type or specifications, whereby it is possible to substantially reduce the product number of the wire harness, and the minimum requisite circuits for the vehicle specifications are combined, so that it is possible to incorporate an optimum circuit into a vehicle without paying any particular attention to the product number, thereby effectively achieving a reduction in cost and weight.

Further, when mounting the sub harnesses to the wire harness holding portion, the option sub harnesses are first mounted, and the common base sub harness is finally mounted, so that the thin option sub harnesses are pressed down by the thick common base sub harness, which enables the entire sub harnesses to be secured in position, and helps to prevent the option sub harnesses from being dislocated to stick out of the wire harness holding portion or cause noise generation.

Further, by adopting a wire harness holding portion having a substantially V-shaped sectional configuration, the option sub harnesses are easily gathered at the bottom of the wire harness holding portion, thereby further enabling the sub harnesses to be set in position.

When, instead of using the wiring table, the wire harness is directly mounted to the vehicle-mounted component, it is possible to omit the conventional wire harness assembly process, making it possible to substantially reduce the requisite space for wire harness assembly.

(Fourth Embodiment)

In the wire harness mounting type vehicle component of the above-described embodiments, the trunk portion of the wire harness is held, whereas no consideration is given to the protection of the branch lines. Thus, after the mounting of the wire harness, it is necessary to perform sheathing processing for protecting the branch lines, which takes time and labor. In particular, in the production system in which the mounting of the wire harness is executed simultaneously with the assembly of the vehicle component, if the processing of the wire harness takes time, the requisite balance in cycle time for the entire system cannot be ensured, resulting in a deterioration in productivity.

In accordance with the fourth embodiment of the present invention, there is provided a wire harness mounting type vehicle component in which the above problem has been eliminated.

Figure 32:
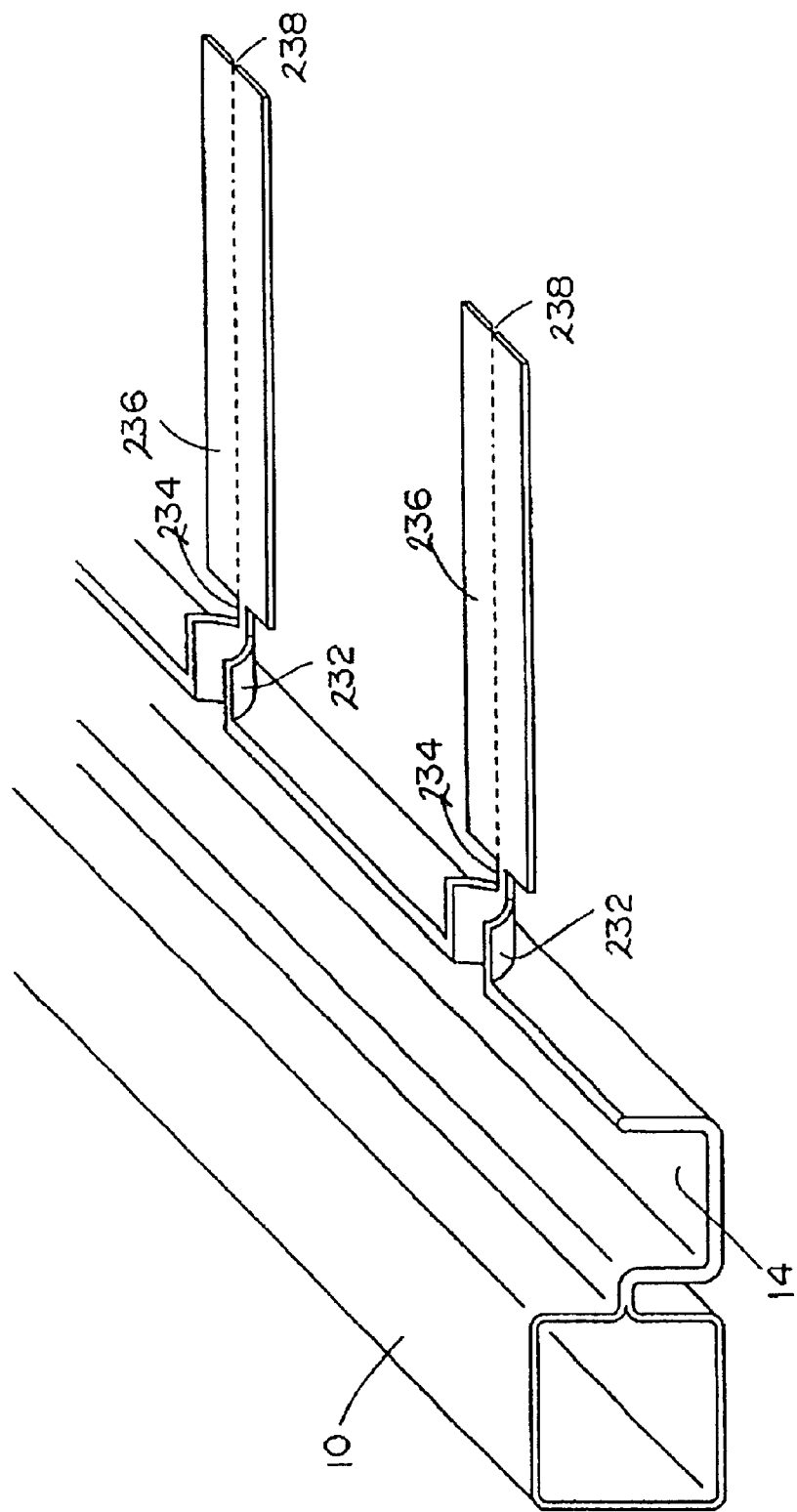
FIG. 32 is a perspective view showing a wire harness mounting type vehicle component according to an embodiment of the present invention.

FIG. 32 shows an embodiment of the present invention. In this wire harness mounting type vehicle component, the air conditioning duct 10 is formed integrally with a trunk line holding portion 14 for holding the trunk line of a wire harness. At the positions of the trunk line holding portion 14 where the branch lines branch off from the trunk line, branching-off guides 232 are integrally formed, and at the forward end of each branching-off guide 232, there is integrally formed, through the intermediation of a connecting member 234, a branch line protecting member 236 along which a branch line of the wire harness extends.

Figure 33:
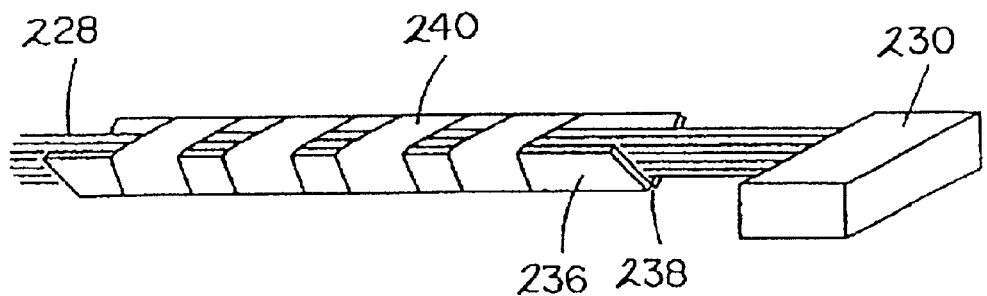
FIG. 33 is a perspective view showing a state in which a guy of a wire harness is protected by a guy protecting member of the vehicle component of FIG. 32.

The trunk line holding portion 14 is a trough-like member extending parallel to the air conditioning duct 10. The branching-off guides 232 are in the form of short trough-like members protruding from the trunk line holding portion 14. Each branch line protecting member 236 is in the form of a thin and narrow plate having on its back side a longitudinal groove 238 (dashed line) formed at the center with respect to the width direction, the branch line protecting member being bendable along this groove 238. When protecting a branch line of the wire harness by this branch line protecting member 236, the branch line protecting member 236 is bent into a V-shape along the groove 238, as shown in FIG. 33. The branch line 228 of the wire harness is held in this V-shaped groove and secured in position by winding an adhesive tape 240 around the outer periphery of the whole. Numeral 230 indicates a connector mounted to the forward end of the branch line 228. The direction of the branch line protecting member 236 can be adapted to the lead-out direction of the branch line 228 by bending at the connecting member 234.

The wire harness mounting type vehicle component as shown in FIG. 32 can be produced by blow molding. In blow molding, semi-molten resin, such as polyethylene or polypropylene, in the form of a cylinder is put in a mold, and high-pressure air is introduced into the cylinder to thereby effect molding. The portion other than the hollow air conditioning duct 10 is formed by crushing a resin cylinder into a twofold structure.

Figure 34:
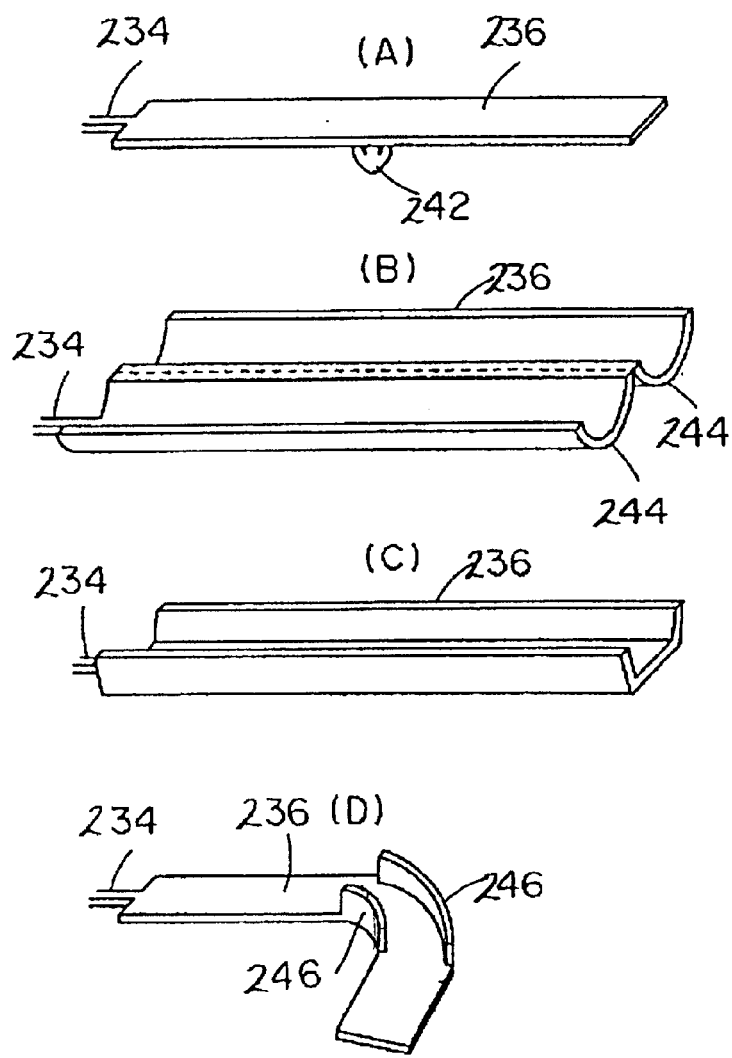
FIGS. 34(A) through 34(D) are perspective views showing other examples of a guy protecting member that can be used in a wire harness mounting type vehicle component according to the present invention.

The branch line protecting member 236 is not restricted to the form as shown in FIG. 32. FIGS. 34A through 34D show examples of other possible forms. The branch line protecting member 236 shown in FIG. 34A has on its back side an integrally formed clip 242. By locking this clip 242 to some other member, it is possible to control the lead-out direction of the branch line of the wire harness. The branch line protecting member 236 shown in FIG. 34B is composed of two semi-cylindrical members 244 hinged to each other. By mating the two semi-cylindrical members 244 with each other into a cylinder, the entire periphery of the wire harness branch line is covered. The branch line protecting member 236 shown in FIG. 34C has a substantially U-shaped sectional configuration, which facilitates the accommodation of the wire harness branch line and helps to achieve an improvement in terms of the efficiency in the tape winding operation. The branch line protecting member 236 shown in FIG. 34D has in the middle portion thereof a curved portion in conformity with the cabling path of the wire harness branch line. On either side of the curved portion, there is provided a side wall 246 to thereby achieving an improvement in terms of the efficiency in the operation of shaping the wire harness branch line.

Figure 35:
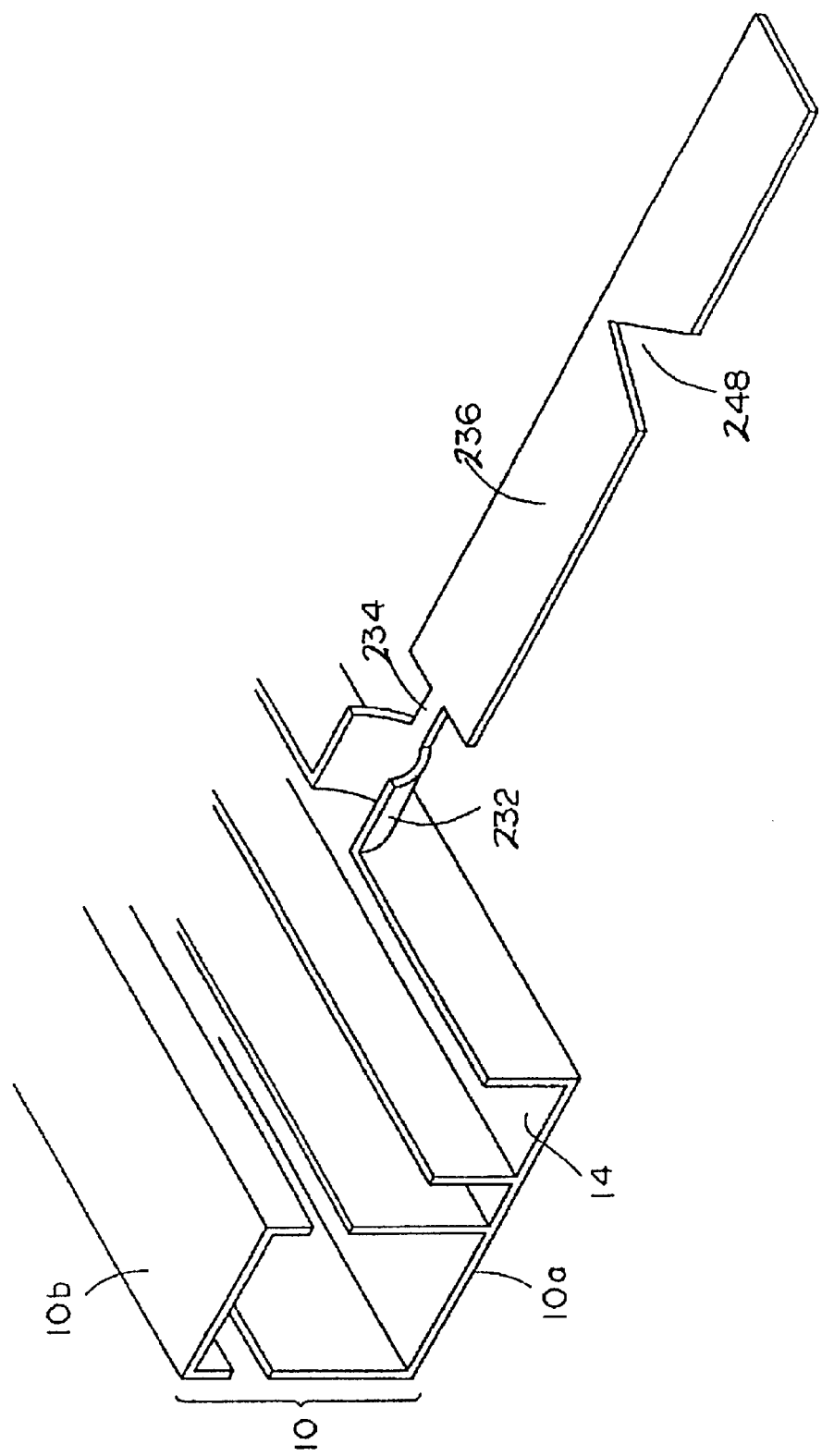
FIG. 35 is a perspective view showing a wire harness mounting type vehicle component according to another embodiment of the present invention.

FIG. 35 shows another embodiment of the present invention. In this embodiment, the wire harness mounting type vehicle component is produced by injection molding. Unlike blow molding, injection molding does not allow molding into a closed form. Thus, the air conditioning duct 10 is divided into two longitudinal members 10$a$ and 10$b$. One member 10$a$ is formed integrally with the trunk line holding portion 14, branching-off guides 232, connecting members 234, and branch line protecting members 236, whereas the other member 10$b$ is formed as a unitary member. The two members 10$a$ and 10$b$ are then joined to each other by oscillation welding or the like to form the air conditioning duct 10.

In this embodiment, the branch line protecting member 236, which is in the form of a plate, has a V-shaped cutout 248 at one side edge of the middle portion with respect to the length direction. This allows the branch line protecting member 236 to be bent in the width direction or the thickness direction in conformity with the cabling path of the branch line of the wire harness.

Figure 36:
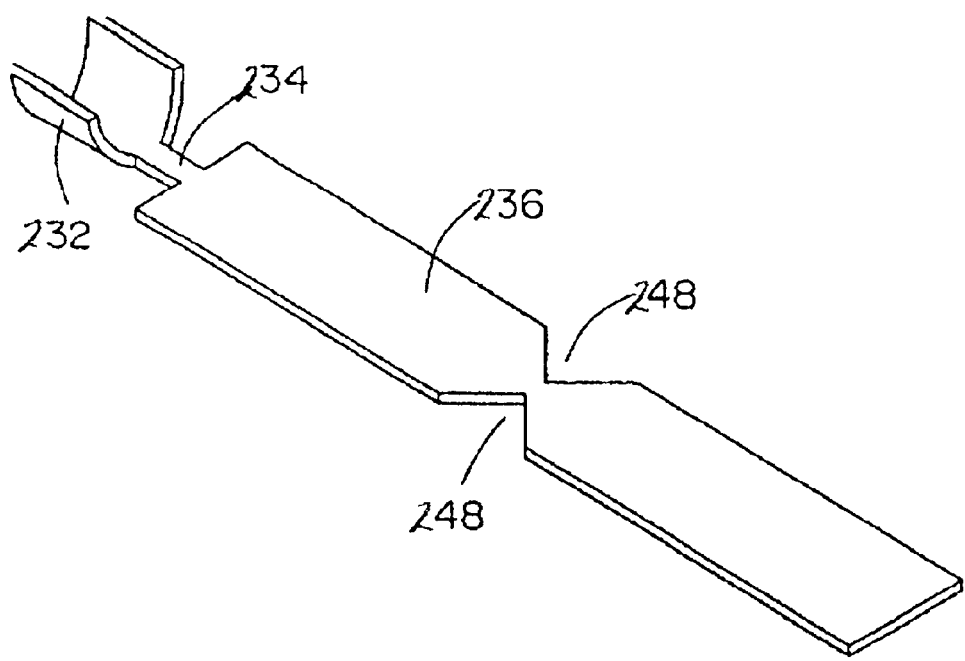
FIG. 36 is a perspective view showing still another example of a guy support member that can be used in a wire harness mounting type vehicle component according to the present invention.

As shown in FIG. 36, it is also possible to form a V-shaped cutout 248 at either side edge of the middle portion of the branch line protecting member 236 so as to allow it to be bent at the middle portion with respect to the length direction.

While in the above-described embodiments the vehicle component is an air conditioning duct, this should not be construed restrictively. The present invention is also applicable to vehicle components other than the air conditioning duct.

As described above, in the wire harness mounting type vehicle component of the fourth embodiment of the present invention, the wire harness branch line protecting members are formed integrally with the wire harness trunk line holding portion, which is formed integrally with the vehicle component. Thus, in the process for mounting the wire harness to the vehicle component, the sheathing operation for protecting the branch lines of the wire harness can be conducted easily and in a short time. When adopting the production system in which the mounting of the wire harness is conducted simultaneously with the assembly of the vehicle component, this not only helps to achieve an improvement in productivity but also makes it easier to keep cycle time in balance for the entire system, whereby the design of the production line is facilitated.

(Fifth Embodiment)

When combining a plurality of sub harnesses to produce a wire harness in accordance with the vehicle specifications, it is necessary to check whether the wire harness produced consists of a combination of sub harnesses in conformity with the vehicle specifications. When the sub harnesses are produced automatically, the requisite quality can be guaranteed by executing a sampling inspection on continuity. Also in the case in which the sub harnesses are produced manually, the requisite quality can be guaranteed by performing continuity inspection at the stage where the sub harnesses have been completed. It is disadvantageous from the viewpoint of efficiency to conduct continuity inspection again on the wire harness obtained by joining the sub harnesses to each other.

Conventionally, however, no effective method has been available for checking whether a combination type wire harness obtained consists of a combination of sub harnesses in conformity with the vehicle specifications.

In view of this, in accordance with the fifth embodiment of the present invention, there are provided a wire harness assembly method and a wire harness inspecting method in which, when assembling a single wire harness by selectively combining a plurality of sub harnesses in accordance with the vehicle specifications, it is possible to easily check whether the wire harness assembled consists of a combination of sub harnesses in conformity with the vehicle specifications.

Figure 37:
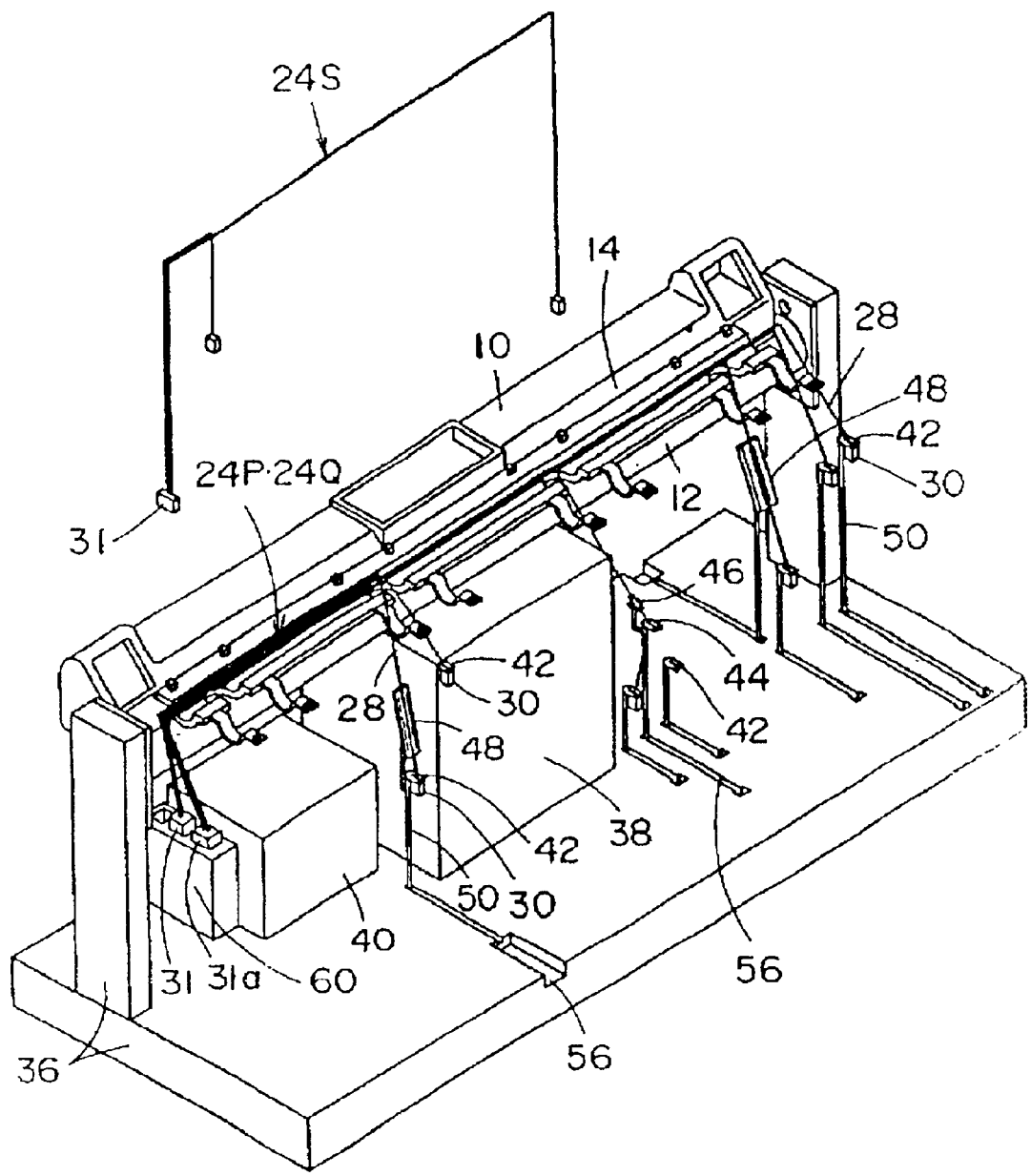
FIG. 37 is a perspective view showing a wire harness assembly method according to an embodiment of the present invention.
Figure 38:
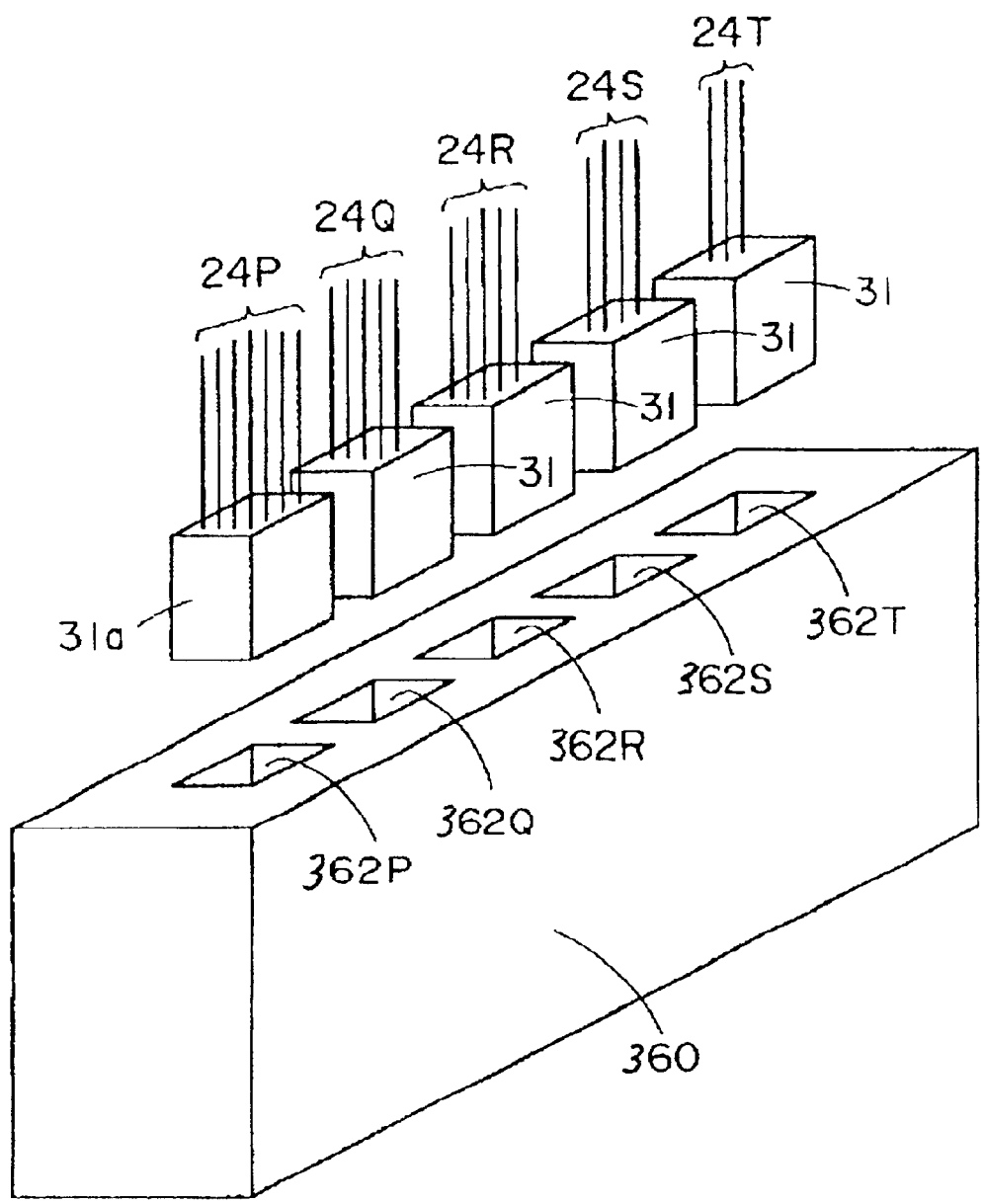
FIG. 38 is a perspective view showing the relationship between each sub harness and an electrical connection box in the assembly method of the present invention.

In FIG. 37, numeral 60 indicates an electrical connection box, which is fastened to the left-hand side of the reinforcing bar 12 by means of a bracket. As shown in FIG. 38, in the electrical connection box 360, there are aligned fitting portions 362P through 362T into which the specific connectors 31$a$ and 31 of the sub harnesses 24P through 24T are aligned to be fitted.

First, the wiring of the common sub harness 24P is effected, and the specific connectors 31$a$ through 31$c$ thereof (See FIG. 28) are fitted into the electrical connection box 360. The common sub harness 24P mounted is common to all vehicle specifications, so that it is not always necessary for this sub harness to be inspected like the option sub harnesses. However, if one of the specific connectors 31$a$ through 31$c$, for example, the specific connector 31$a$ (FIGS. 37 and 38 do not show the connectors 31$b$ and 31$c$), is aligned with the specific connectors 31 of the option sub harnesses on the electrical connection box 360 and fitted into it, it is possible to check whether the common sub harness has been incorporated simultaneously with the inspection on the combination of option sub harnesses.

Next, the wiring of the first option sub harness 24Q is effected, and the specific connector 31 thereof is fitted into the predetermined fitting portion 362Q of the electrical connection box 360. In the example shown in FIG. 37, the specifications of the wire harness to be produced is such that the first option such harness 24Q (for automatic vehicle) and the third option sub harness 24S (for power window) are incorporated, the other option sub harnesses not being incorporated. Thus, when the wiring of the third option sub harness 24S is finally effected, and the specific connector 31 thereof is fitted into the predetermined fitting portion 362S of the electrical connection box 360, the mounting of the sub harnesses is completed.

After this, the trunk portion of the wire harness is wrapped in a soft sheet material, and fixed to the wire harness holding portion 14 by means of the fastening members 18. Further, the portions of the branch portions 28 of the common sub harness 24P and those of the branch portions 28 of the sub harnesses 24Q and 24S which extend through the same paths are respectively put together, and sheathing processing, such as tape winding and corrugate tube attachment, is executed thereon. In this way, a wire harness in conformity with vehicle specifications is assembled.

Figure 39:
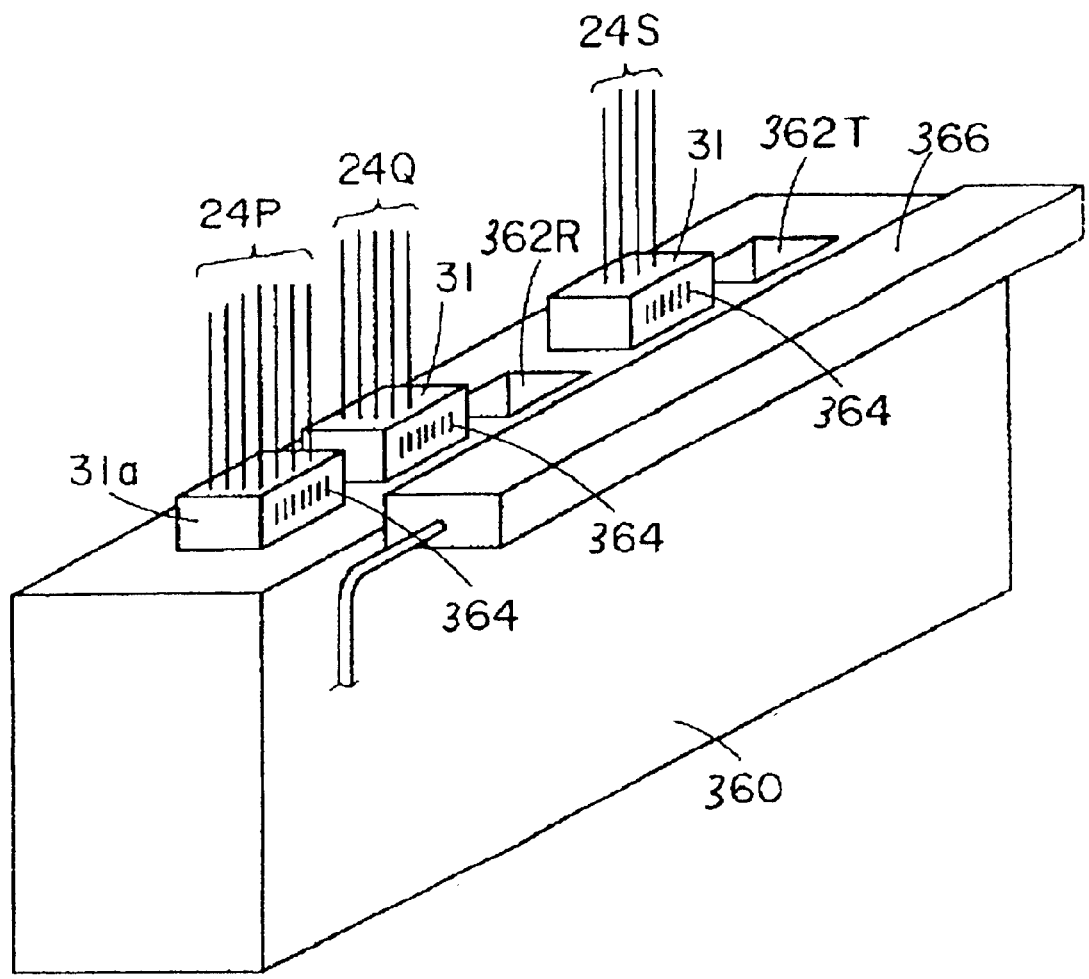
FIG. 39 is a perspective view showing a wire harness inspecting method according to an embodiment of the present invention.

Next, a method for inspecting a wire harness assembled will be described. FIG. 39 shows an embodiment of the inspecting method of the present invention. In this embodiment, bar-codes 364 for identifying the sub harnesses 24P through 24T are imparted to the specific connectors 31a and 31 of the sub harnesses 24P through 24T, and the bar-codes 364 of the specific connectors 31a and 31 fitted into the electrical connection box 360 are read by a bar-code reader 366, whereby the presence/absence of the specific connectors is detected, and a judgment is made as to whether the sub harness combination is in conformity with the vehicle specifications. It is also possible to link the reading result of the bar-code reader with information on the vehicle specifications to make the above judgment.

Figure 40:
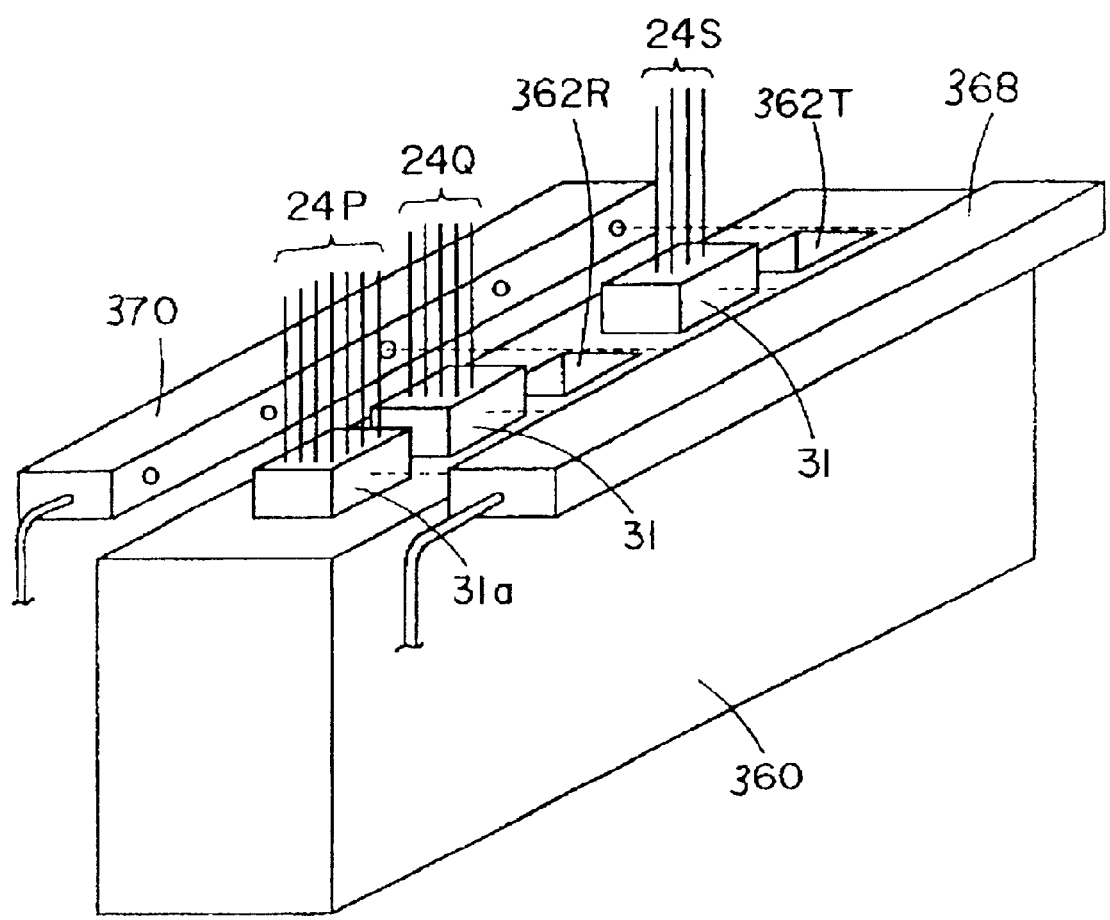
FIG. 40 is a perspective view showing another embodiment.

FIG. 40 shows another embodiment of the wire harness inspecting method of the present invention. In this embodiment, the inspection is performed by an optical means. A light emitter 368 and a light receiver 370 are installed so as to be opposed to each other, with the specific connectors 31a and 31 fitted into the electrical connection box 360 being therebetween. The light from the light emitter 368 is intercepted where the specific connectors 31a and 31 are fitted, and the light can only be received by the light receiver 370 where no specific connectors are fitted, whereby the presence/absence of specific connectors is detected, and a judgment is made as to whether the sub harness combination is in conformity with the vehicle specifications. It is also possible to detect the presence/absence of specific connectors from reflection of light by the specific connectors. This is advantageous in that the light emitting portion and the light receiving portion can be installed on one side of the specific connectors.

Figure 41:
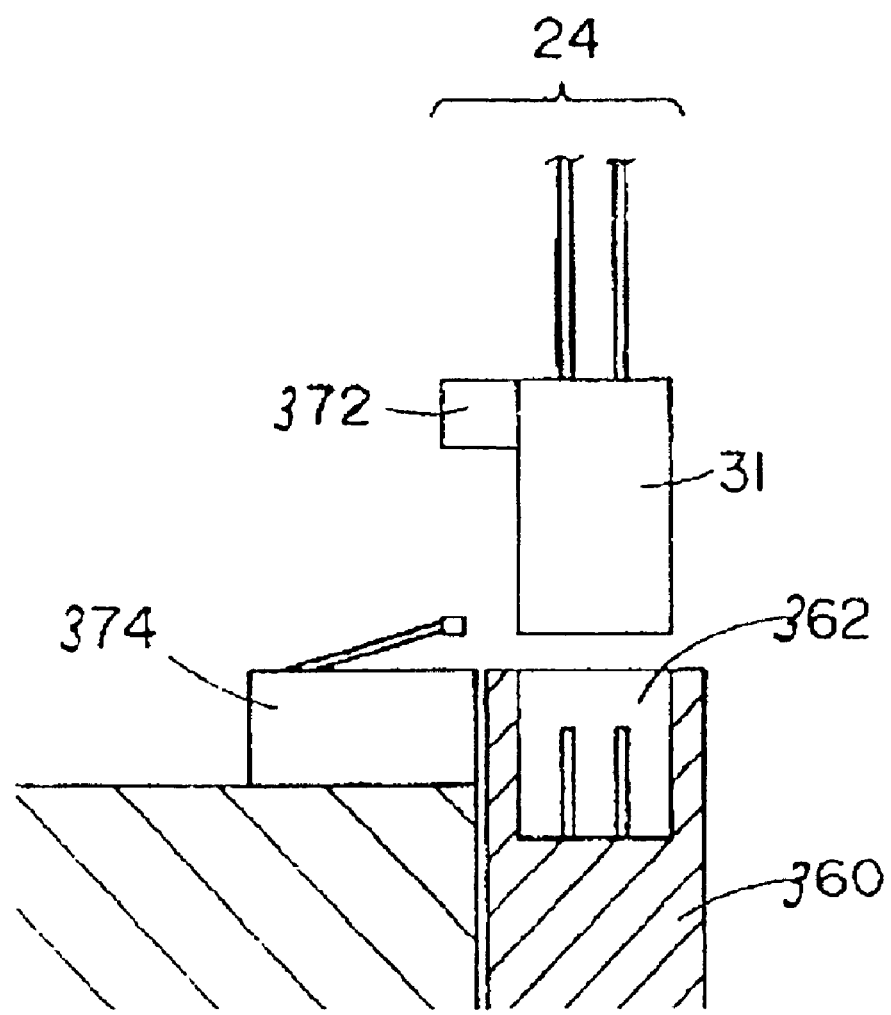
FIG. 41 is a main-portion sectional view of still another embodiment.

FIG. 41 shows still another embodiment of the wire harness inspecting method of the present invention. In this embodiment, a protrusion 372 is formed on the specific connector 31 of each sub harness 24, and a limit switch 374 is installed in the vicinity of each fitting portion 362 of the electrical connection box 360. When the specific connector 31 is fitted into the fitting portion 362, the protrusion 372 operates the limit switch 374, whereby it is detected whether the specific connector 31 has been fitted into the fitting portion 362, thereby checking whether the sub harness combination is in conformity with the vehicle specifications. While FIG. 41 only shows one sub harness 24 and one fitting portion 362, the same above construction applies to other sub harnesses and fitting portions as well.

In the above-described embodiments the specific connectors of the sub harnesses are aligned on an electrical connection box, whereby the inspection device is simplified, and the inspection time is shortened.

Figure 42:
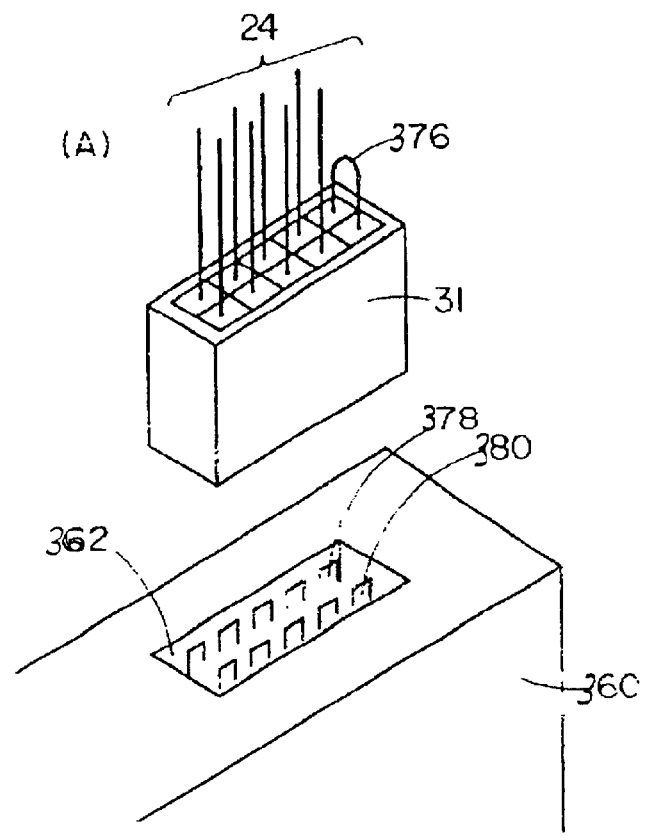
FIG. 42(A) is a main-portion sectional view of still another embodiment.
FIG. 42(B) is a circuit diagram thereof.
Figure 42:
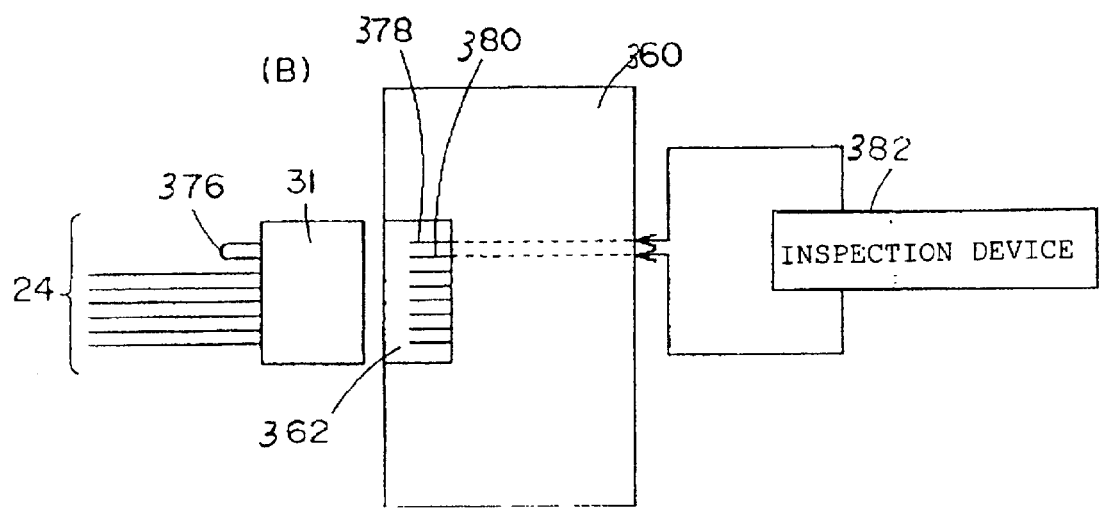

FIGS. 42A and 42B show still another embodiment of the wire harness inspecting method of the present invention. In this embodiment, the inspection is conducted electrically. A short circuit 376 for a pair of terminals is provided in the specific connector 31 of each sub harness 24, and, in each fitting portion 362 of the electrical connection box 360, there are provided a pair of terminals 378, 380 adapted to be short-circuited by fitting in the specific connector 31. An inspection device 382 detects whether the terminals 378 and 380 have been short-circuited to detect the presence/absence of the specific connector 31, thereby checking whether the sub harness combination is in conformity with the vehicle specifications or not. While FIG. 42A only shows one sub harness 24 and one fitting portion 362, the same above construction applies to other sub harnesses and fitting portions as well. In the case of this inspecting method, there is no need for the sub harnesses to be aligned on the electrical connection box.

In another embodiment, different colors are given to the specific connectors of the sub harnesses, and inspection is effected by identifying the color of the connector fitted into the electrical connection box.

While in the above-described embodiments there is only one electrical connection box, a plurality of electrical connection boxes may be installed. In this case, the requisite power circuits for the sub harnesses are all provided from one electrical connection box, and the specific connector of each sub harness is always fitted into one electrical connection box, which leads to simplification of the inspection device. However, also in the case where there are a plurality of electrical connection boxes, an inspection similar to that of the above-described embodiments may be conducted in the plurality of electrical connection boxes to collect information obtained by the plurality of electrical connection boxes, whereby it is possible to check whether predetermined sub harnesses have been incorporated or not.

As described above, in accordance with the fifth embodiment of the present invention, when assembling a wire harness by selectively combining a plurality of sub harnesses in accordance with the vehicle specifications, specific connectors to be fitted into an electrical connection box are provided respectively for all the sub harnesses, and, when assembling the wire harness, the specific connector of each sub harness is fitted into a predetermined portion of the electrical connection box. Thus, by detecting the presence/absence of a specific connector at the electrical connection box, it can be easily checked whether the sub harness combination is in conformity with the vehicle specifications or not, whereby the inspection of the wire harness assembled can be conducted reliably and in a short time.

Further, by aligning on the electrical connection box fitting portions into which the specific connectors of the sub harnesses are to be fitted, the inspection device is simplified, and the presence/absence of all the specific connectors can be checked simultaneously, thereby making it possible to shorten the inspection time.

Further, there is a secondary effect that the mounting of the base/option sub harness can be performed easily, as the end of the sub harness is fitted and fixed to the electrical connection box.

(Sixth Embodiment)

Sub wire harnesses are classified into a common base sub harness common to a plurality of vehicle types or a plurality of specifications of a single vehicle type and consisting of a collection of a relatively large number of common circuits, and an option sub wire harness used for a specific vehicle type or certain specifications and having a relatively small number of (at least one) circuits. These sub wire harnesses are appropriately combined in accordance with the vehicle type and specifications and mounted to a wire harness holding portion of a vehicle component.

However, the conventional wire harness mounting type vehicle component under study involves the following problems. When mounting the sub wire harnesses to the wire harness holding portion, the option sub wire harnesses, having a relatively small number of circuits, are not tied in a satisfactory manner, so that the wires are allowed to move freely with respect to the wire harness holding portion, which makes it difficult to correctly set the branch line branching-off positions. Thus, it is difficult to ensure the requisite dimensional accuracy for the branch lines. Further, after the mounting, the sub wire harnesses can freely move in the wire harness holding portion, which leads to generation of noise due to vibration, etc. when the vehicle is running. Further, in the case of a minimum equipment specification, it is only a common base sub wire harness that is incorporated into a vehicle; in the case of a full equipment specification, there are incorporated, in addition to the common base sub wire harness, all the option sub wire harnesses. Thus, the thickness of the wire harness greatly varies depending on the specifications. On the other hand, the size of the wire harness holding portion provided on an air conditioning duct, reinforcing bar or the like remains mostly the same. Thus, in the case of a vehicle with a relatively small number of equipment items, the void in the wire harness holding portion is rather large, with the result that the above-mentioned problem is conspicuous.

In accordance with the sixth embodiment of the present invention, there is provided a wire harness mounting type vehicle component in which the protection of the branch lines of the wire harness can be easily effected.

Further, in accordance with the sixth embodiment of the present invention, there is provided a wire harness mounting type vehicle in which the requisite dimensional accuracy for the branch lines of the wire harness can be easily ensured and in which there is no fear of noise generation due to vibration or the like.

Figure 43:
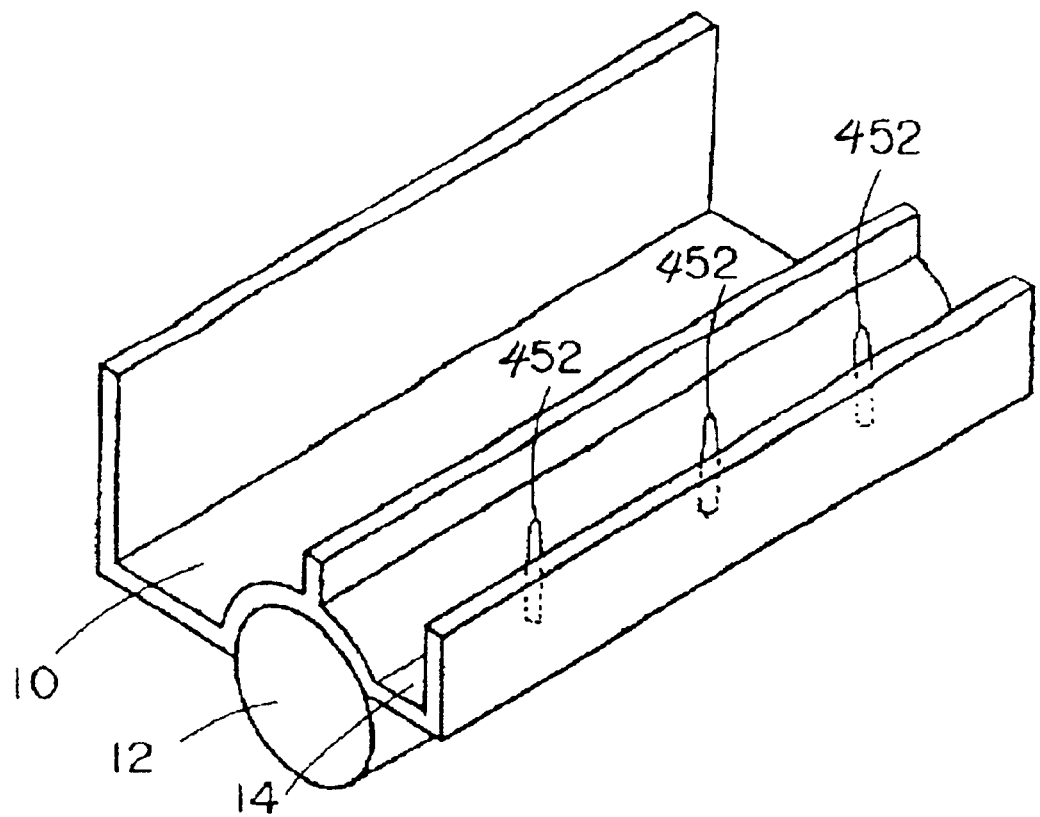
FIG. 43 is a perspective view showing a wire harness mounting type vehicle component according to still another embodiment of the present invention.

FIG. 43 shows the sixth embodiment of the present invention. In this wire harness mounting type vehicle component, the wire harness holding portion 14 is formed integrally with the air conditioning duct 10 (which is of two parts, as shown in FIG. 4, the cover member not being shown), and a large number of bar-like protrusions 452 protrude from the bottom of the wire harness holding portion 14. The bar-like protrusions 452 are integrally formed of the same resin (polypropylene, polyethylene or the like) as the wire harness holding portion 14. Numeral 12 indicates a reinforcing bar extending along the air conditioning duct 10.

Figure 44:
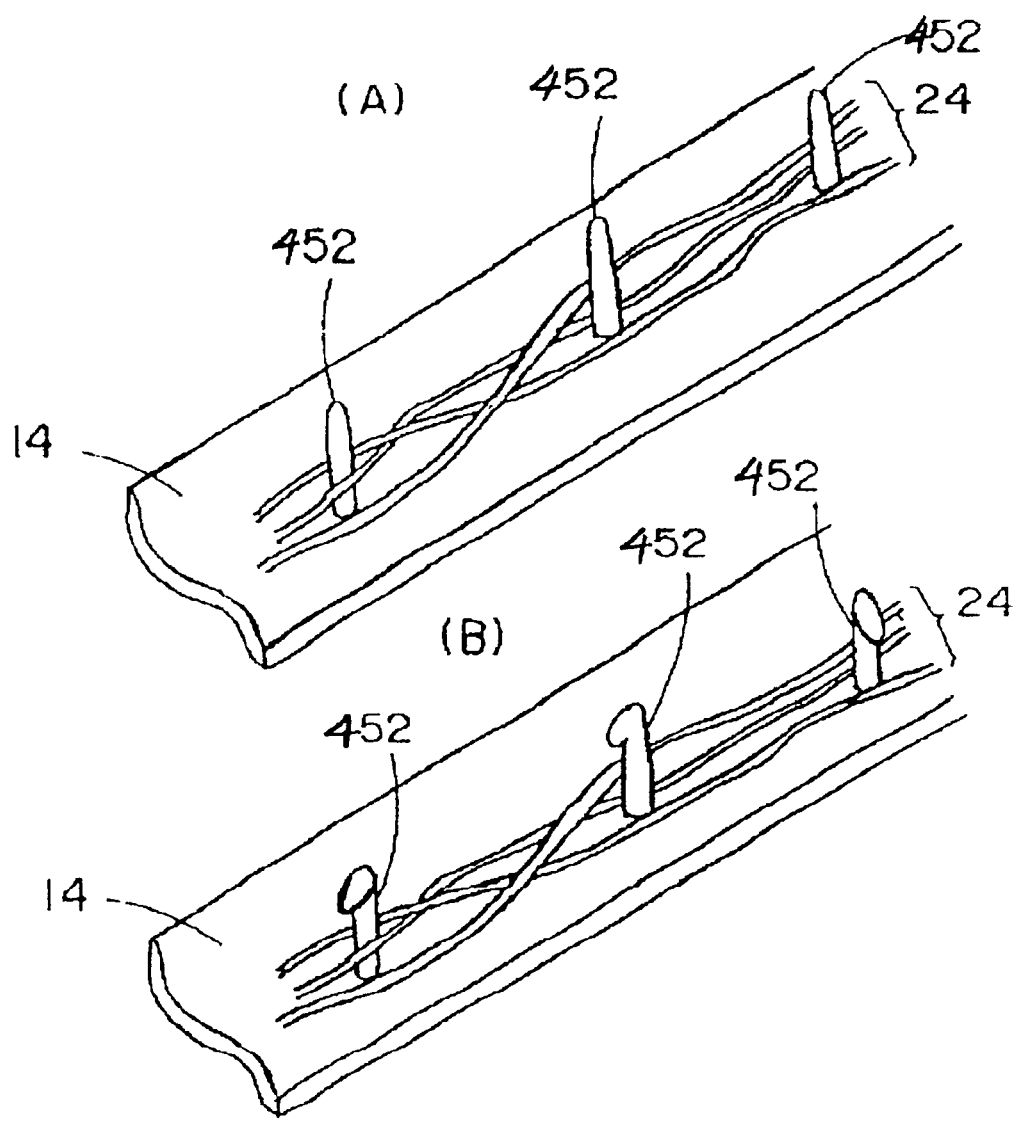
FIG. 44(A) is an explanatory diagram showing a state in which a sub wire harness is mounted to the wire harness holding portion of the vehicle component of FIG. 6.
FIG. 44(B) is an explanatory diagram showing a case in which a different form is adopted for the bar-like protrusion.

Due to the formation of the bar-like protrusions 452, when mounting to the wire harness holding portion 14 an option sub wire harness of a relatively small circuit scale, the bar-like protrusions 452 get into (i.e. pierce through) the gaps between the wires in the sub wire harness 24, as shown in FIG. 44A, whereby the sub wire harness 24 is prevented from moving freely. Thus, there is no fear that the branch line branching-off positions will be displaced at the time of mounting or that noise will be generated due to vehicle vibration after the mounting.

Further, also when a plurality of option sub wires are successively mounted, the operational efficiency is quite satisfactory. Note that, FIG. 44A only shows the bottom plate portion, with the side walls of the wire harness holding portion 14 being omitted.

It is desirable that injection molding be adopted when forming the bar-like protrusions 452 on the bottom plate portion of the wire harness holding portion 14. However, by providing the mold with recesses corresponding to the bar-like protrusions, it is also possible to adopt blow molding.

FIG. 44B shows an example in which the forward ends of the bar-like protrusions 452 have a hook-like configuration. This helps to prevent the wires of the sub wire harness 24 mounted to the wire harness holding portion 14 from being dislocated to stick out of the wire harness holding portion 14, thereby achieving an improvement in terms of operational efficiency in mounting.

Figure 45:
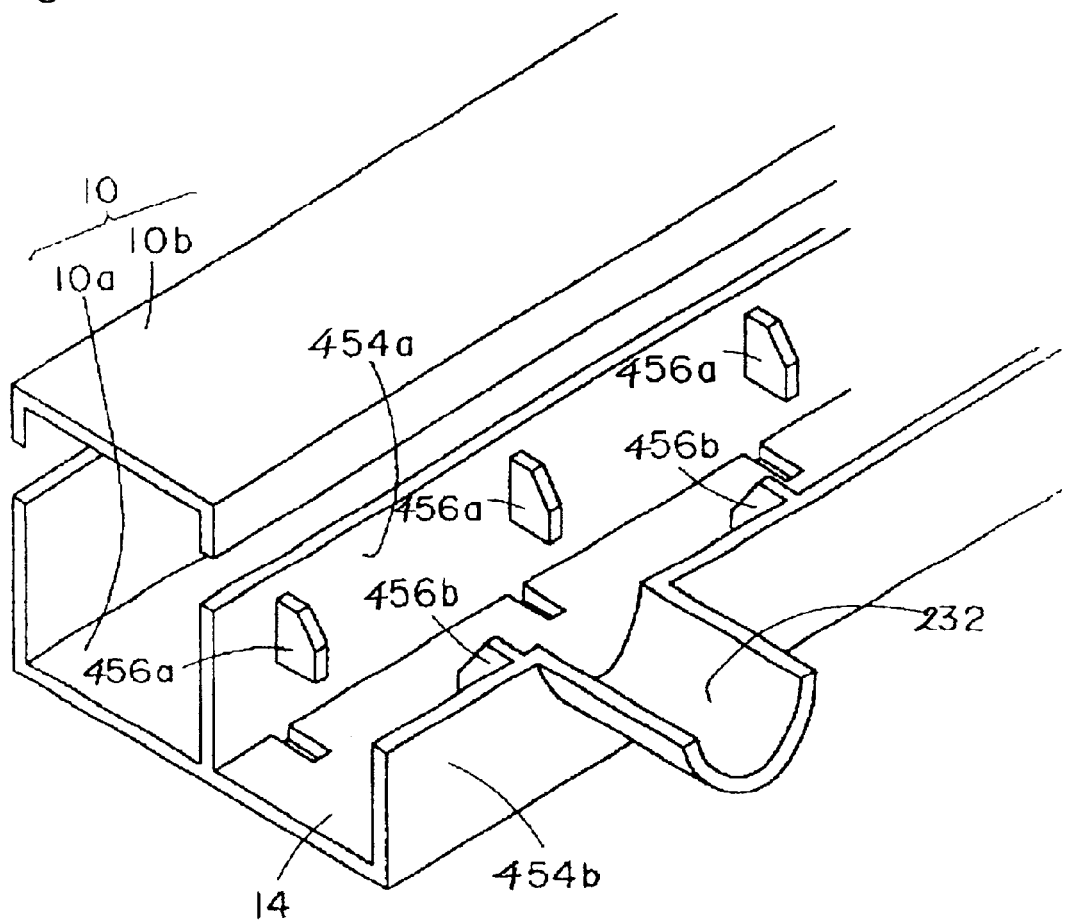
FIG. 45 is a perspective view showing a wire harness mounting type vehicle component according to still another embodiment of the present invention.
Figure 46:
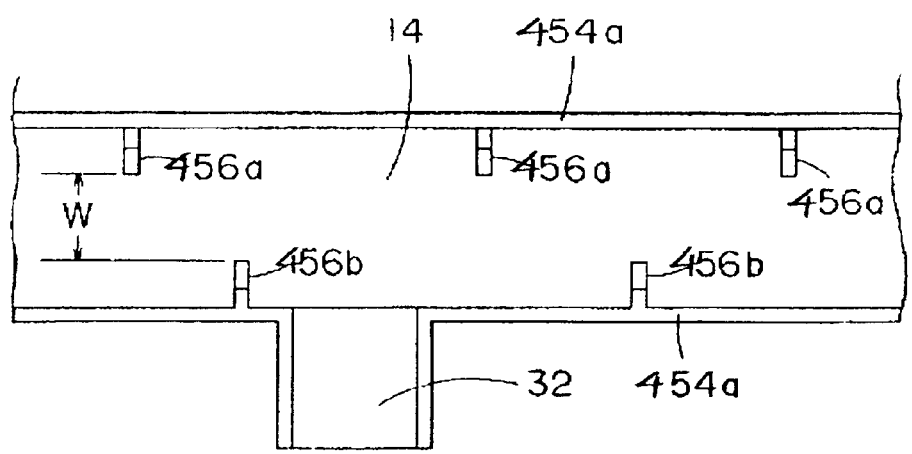
FIG. 46 is a plan view of a wire harness holding portion of the vehicle component of FIG. 45.

FIGS. 45 and 46 show still another embodiment of the present invention. In this wire harness mounting type vehicle component, the wire harness holding portion 14 is formed integrally with the air conditioning duct 10, and plate-like protrusions 456a and 456b whose forward ends are to be pressed against the wire harness protrude alternately from the inner surfaces of the side walls 454a and 454b of the wire harness holding portion 14, as shown in FIG. 46. The protrusions 456a and 456b are formed such that their lower sides are spaced apart from the bottom plate portion of the wire harness holding portion 14. This embodiment is suitable for the case in which the option sub wire harnesses are first mounted to the wire harness holding portion 14, and in which the common base sub wire harness is finally mounted.

The common base sub wire harness consists of a collection of circuits provided common to various vehicle equipment specifications, so that, as compared with the option sub wire harness, it is of a relatively large circuit scale and has a considerably large outer diameter. The width as defined by the forward ends of the plate-like protrusions 456a and 456b protruding from the side walls 454a and 454b is set so as to be somewhat smaller than the outer diameter of the common base sub wire harness. The upper forward end portions of the protrusions 456a and 456b are formed as inclined surfaces (i.e., beveled), whereby, when mounting the sub wire harness from above, it is easy to put the sub wire harness between the protrusions 456a and 456b.

The width W defined by the forward ends of the protrusions 456a and 456b is sufficiently larger than the outer diameter of the option sub wire harnesses. Thus, the mounting of the option sub wire harnesses can be effected easily. After the sub wire harnesses have been accommodated in the wire harness holding portion 14, the protrusions 456a and 456b prevent the wires of the option sub wire harnesses from being dislocated to get out of the wire harness holding portion 14.

After all the requisite option sub wire harnesses have been mounted to the wire harness holding portion 14, the common base sub wire harness is finally mounted. Since the upper forward end portions of the protrusions 456a and 456b are formed as inclined surfaces, the common base sub wire harness can be pushed in with a small force. However, since the width W defined by the forward ends of the protrusions is somewhat smaller than the outer diameter of the common base sub wire harness, the common base sub wire harness is accommodated in the wire harness holding portion 14, with its trunk line portion meandering to some degree. As a result, the common base sub wire harness is fixed to the wire harness holding portion 14 due to the friction between it and the protrusions 456a and 456b. As for the option sub wire harnesses previously mounted, they are pressed down by the common base sub wire harness. Thus, the sub wire harnesses are restrained in their movement in the wire harness holding portion 14.

In FIGS. 45 and 46, numeral 232 indicates a branching-off guide formed at a position where a branch line branches off from the trunk line of the wire harness. It is desirable for a branch line protecting member 236 (See FIG. 32) to be integrally formed at the forward end of the branching-off guide 232. This also applies to the following embodiments.

Figure 47:
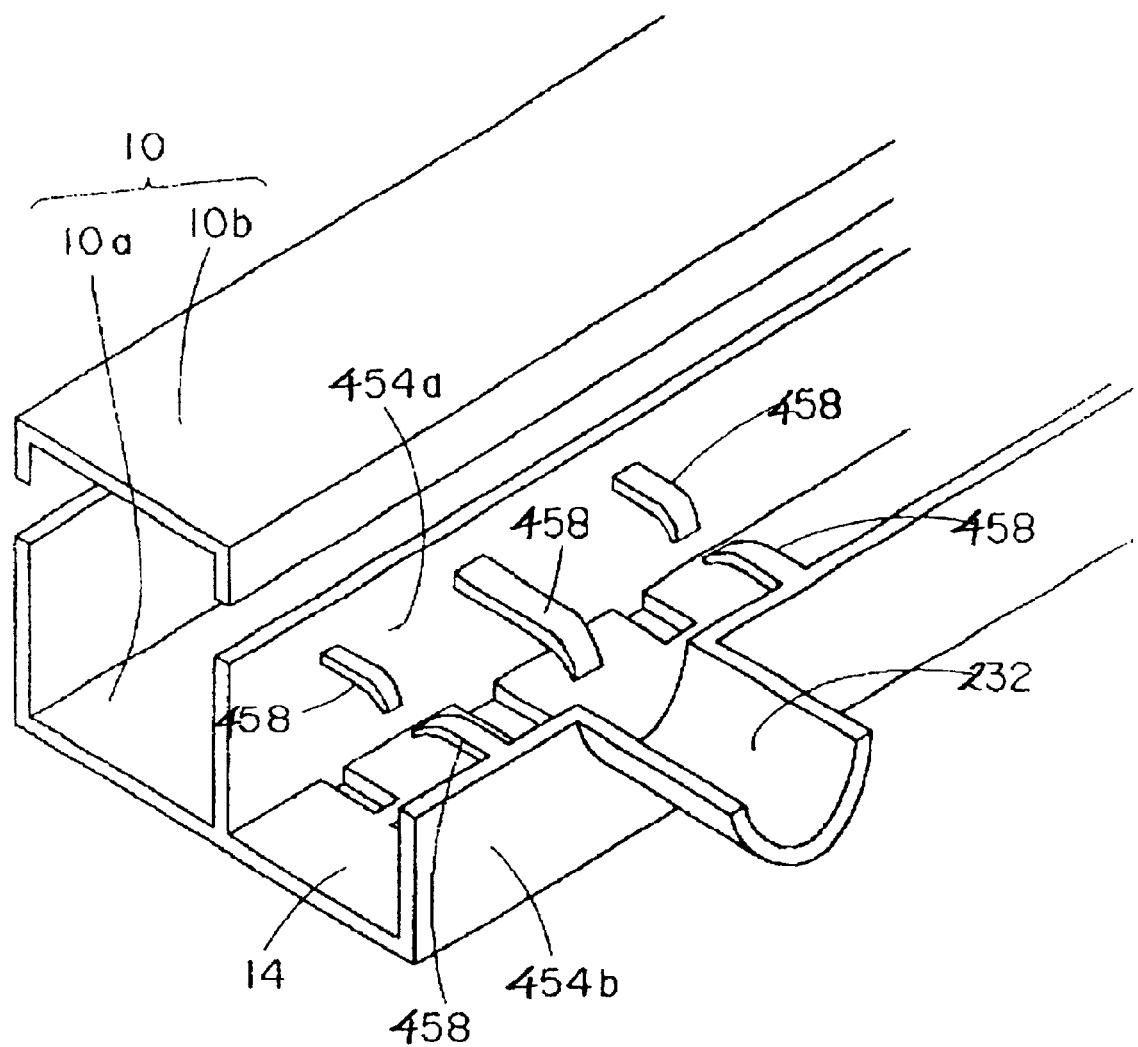
FIG. 47 is a perspective view showing a wire harness mounting type vehicle component according to still another embodiment of the present invention.

FIG. 47 shows still another embodiment of the present invention. In this wire harness mounting type vehicle component, the wire harness holding portion 14 is formed integrally with the air conditioning duct 10, and formed on the inner sides of the side walls 54a and 54b of the wire harness holding portion 14 are elastic arm members 458 for pressing down the wire harnesses in the wire harness holding portion 14. When a sub wire harness is mounted to the wire harness holding portion 14, the elastic arm members 458 undergo elastic deformation to enable the sub wire harness to be pushed in. After the sub wire harness has been accommodated in the wire harness holding portion 14, the elastic arm members prevent the wires from being dislocated to stick out of it. After all the sub wire harnesses have been mounted, the elastic arm members press down the wire harnesses from above, preventing the sub wire harnesses from moving inside the wire harness holding portion 14. Providing the elastic arm members 458 at the position corresponding to the branching-off guide 232 and on either side thereof is particularly effective in preventing the wires from sticking out, moving, etc.

Figure 48:
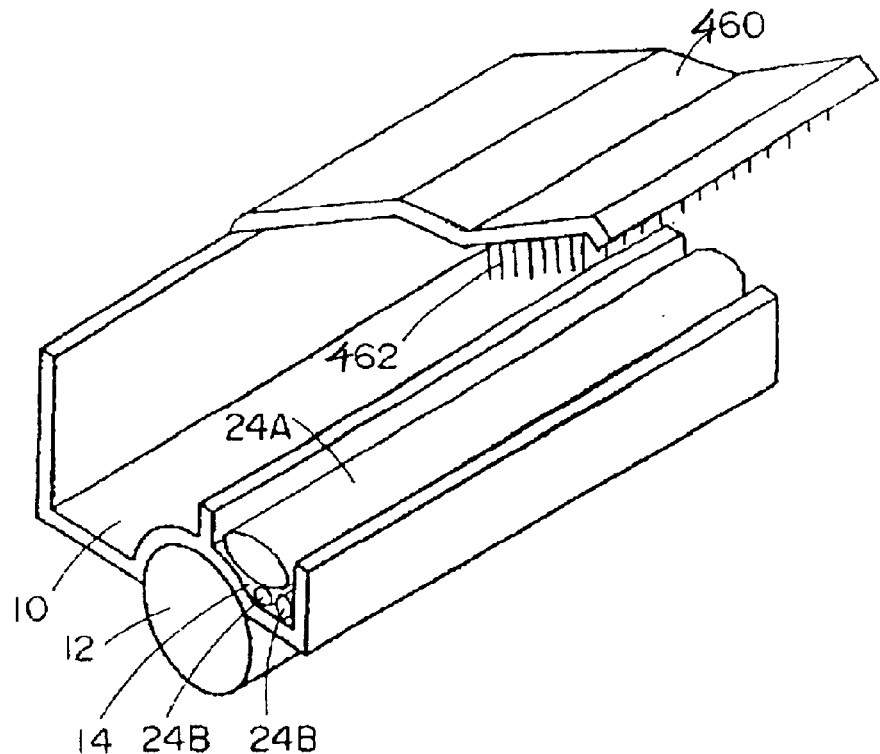
FIG. 48 is a perspective view showing a wire harness mounting type vehicle component according to still another embodiment of the present invention.

FIG. 48 shows still another embodiment of the present invention. In this wire harness mounting type vehicle component, the wire harness holding portion 14 is formed integrally with the air conditioning duct 10, the reinforcing bar 12 extends along the same, and there is provided a cover 460 to be placed on the air conditioning duct 10 and the wire harness holding portion 14, the cover 460 having a large number of elastic protrusions 462 on the wire harness holding portion 14 side inner surface. While in this example the cover 460 is hinged to the edge of the wire harness holding portion 14 so as to allow opening and closing, it may also be a component separate from the air conditioning duct 10 and the wire harness holding portion 14.

Figure 49:
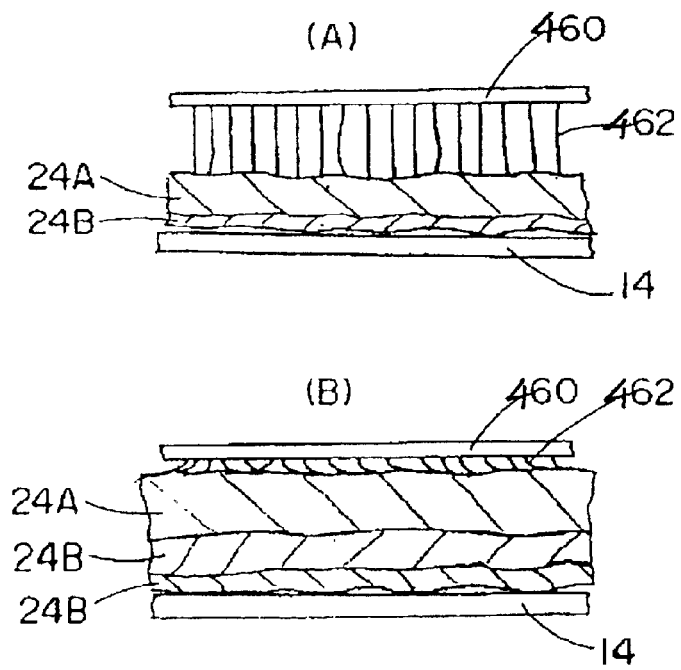

The elastic protrusions 462 are freely deformed in accordance with the void in the wire harness holding portion 14 so as to press down the common base sub wire harness 24A and the option sub wire harnesses 24B in the wire harness holding portion 14. When the number of option sub wire harnesses 24B in the wire harness holding portion 14 is small, the elastic protrusions 462 are substantially straight as shown in FIG. 49A when they press down the wire harnesses 24A and 24B when the cover 460 is closed, whereas, when the number of option sub wire harnesses 24B is large, the elastic protrusions 462 are bent as shown in FIG. 49B when they press down the wire harnesses 24A and 24B. Thus, it is possible to restrain the wire harnesses in their movement inside the wire harness holding portion 14.

By combining the construction of FIG. 48 with the construction shown in FIG. 43, in which bar-like protrusions 452 are provided, it is possible to achieve a further improvement in terms of operational efficiency in mounting and noise prevention after mounting in the vehicle.

Figure 50:
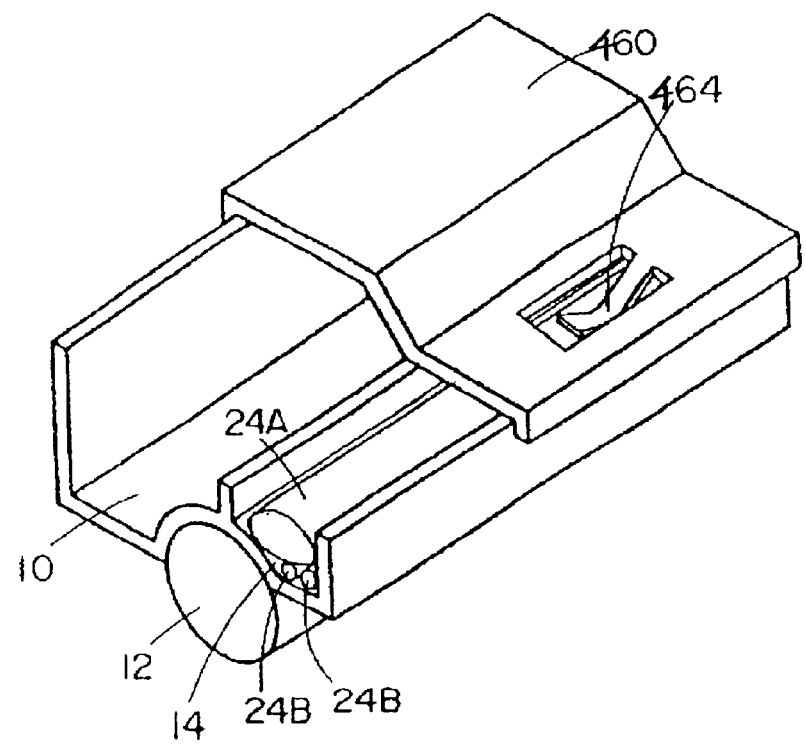
FIG. 50 is a perspective view showing a wire harness mounting type vehicle component according to still another embodiment of the present invention.

FIG. 50 shows still another embodiment of the present invention. In this wire harness mounting type vehicle component, the wire harness holding portion 14 is formed integrally with the air conditioning duct 10, the reinforcing bar 12 extends along the same, and there is provided a cover 460 to be placed on the air conditioning duct 10 and the wire harness holding portion 14, the cover 460 having on the wire harness holding portion 14 side an elastic presser 464 for pressing down the wire harnesses inside the wire harness holding portion 14. While in this example the cover 460 is formed as a component separate from the air conditioning duct 10 and the wire harness holding portion 14, it may also be hinged to the edge of the wire harness holding portion 14 as in the case of FIG. 48.

Figure 51:
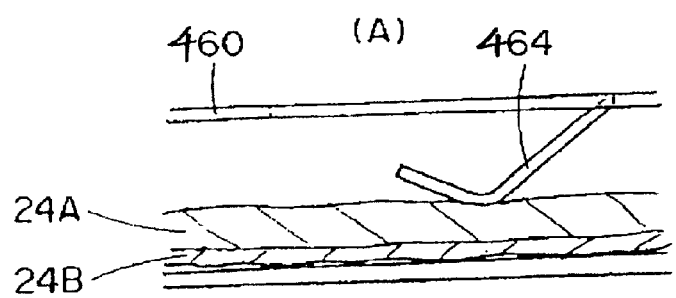
Figure 51:
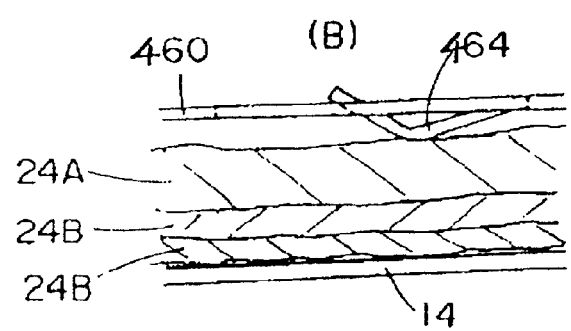

When the number of option sub wire harnesses 24B in the wire harness holding portion 14 is small, the elastic presser 464 is slightly raised by the wire harnesses 24A and 24B as shown in FIG. 51A when it presses down the wire harnesses 24A and 24B, whereas, when the number of the option sub wire harnesses 24B is large, the presser 464 is raised high by the wire harnesses 24A and 24B as shown in FIG. 51B and firmly presses down the wire harnesses 24A and 24B. Thus, it is possible to restrain the wire harnesses in their movement inside the wire harness holding portion 14.

Figure 52:
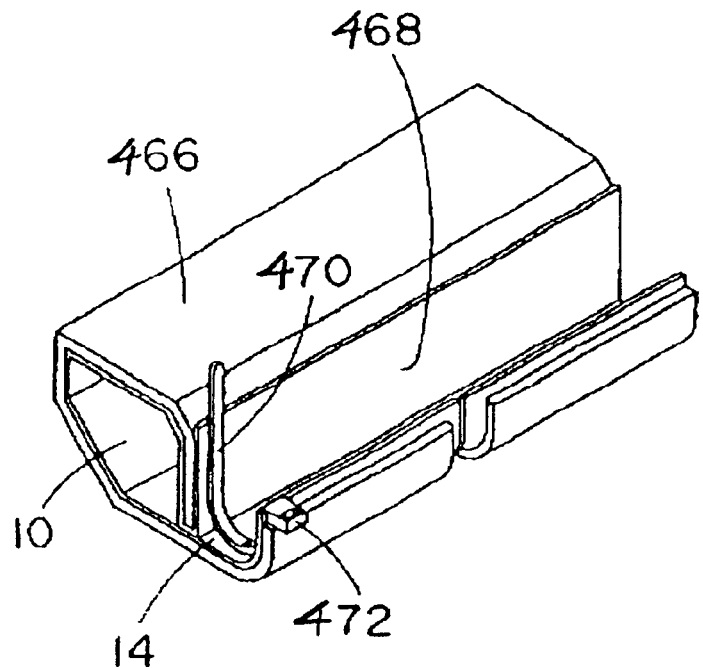
FIG. 52 is a perspective view showing a wire harness mounting type vehicle component according to still another embodiment of the present invention.

FIG. 52 shows still another example of the present invention. This wire harness mounting type vehicle component is made of a material obtained by attaching a resin sheet 468 to a metal plate 466 consisting of aluminum, iron or the like. The composite sheet material thus obtained is bent so as to integrally form the air conditioning duct 10 and the wire harness holding portion 14, with the inner surface of at least the wire harness holding portion 14 being covered with the resin sheet 468. A strap 470 for fixing the wire harnesses is formed integrally with the resin sheet 468. Numeral 472 indicates a lock portion, into which the forward end portion of the strap 470 is inserted so as not to allow pulling out. It is desirable for the strap 470 to be formed integrally with the resin sheet 468 before it is attached to the metal plate 466. In this embodiment, the metal plate 466 formed by bending serves as the reinforcing member. The wire harnesses mounted to the wire harness holding portion 14 are secured in position by the strap 470 and restrained in their movement inside the wire harness holding portion 14.

Figure 53:
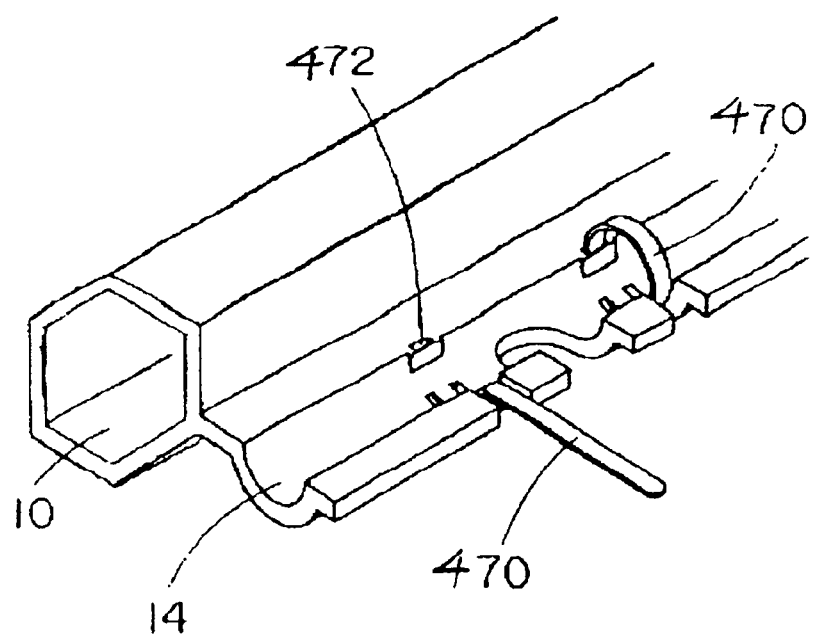
FIG. 53 is a perspective view showing a wire harness mounting type vehicle component according to still another embodiment of the present invention.

FIG. 53 shows still another embodiment of the present invention. In this wire harness mounting type vehicle component, the air conditioning duct 10 and the wire harness holding portion 14 are integrally formed of resin, and the strap 470 for fixing wire harnesses is formed integrally with the wire harness holding portion 14. Numeral 472 indicates a lock portion, into which the forward end portion of the strap 470 is inserted so as not to allow pulling out. In this construction also, the wire harnesses mounted to the wire harness holding portion 14 can be secured in position by the strap 470 and restrained in their movement.

In the wire harness mounting type vehicle component of the sixth embodiment, a movement restraining means for restraining the wire harnesses in their movement is provided in the wire harness holding portion provided on a vehicle component, so that it is possible to restrain the movement of the wire harnesses held by the wire harness holding portion, whereby the requisite dimensional accuracy for the branch lines can be easily ensured, and noise generation due to vibration when the vehicle is running can be prevented.

What is claimed is:

1. A wire harness mounting method for mounting a wire harness to a wire harness holding portion provided on a vehicle-mounted component or a vehicle main body, wherein the wire harness consists of two or more sub wire harnesses produced separately, wherein the two or more sub harnesses include a common base sub harness consisting of a collection of circuits common to a plurality of vehicle types or a plurality of specifications of a single vehicle type, and option sub harnesses each consisting of a collection of at least one circuit for a specific vehicle type or certain specifications, the sub harnesses being appropriately combined in accordance with the vehicle type or specifications arranged on the wire harness holding portion and collectively held by the wire harness holding portion to thereby complete the mounting of the wire harness.

2. The wire harness mounting method according to claim 1, wherein the arrangement of the two or more sub wire harnesses on the wire harness holding portion is conducted in parallel with the assembly of the vehicle in accordance with information on vehicle specifications of the vehicle assembly line.

3. The wire harness mounting method according to claim 1, wherein the vehicle-mounted component is an air conditioning duct or a reinforcing bar in an instrument panel.

* * * * *